(12) United States Patent (10) Patent No.: US 8,473,244 B2
Kimishima (45) Date of Patent: Jun. 25, 2013

(54) ANGULAR VELOCITY CORRECTION DEVICE, ANGULAR VELOCITY CORRECTION METHOD, NAVIGATION DEVICE, AND CELLULAR PHONE HAVING NAVIGATION FUNCTION

(75) Inventor: Masato Kimishima, Tokyo (JP)

(73) Assignee: Sony Corporation, Tokyo (JP)

( * ) Notice: Subject to any disclaimer, the term of this patent is extended or adjusted under 35 U.S.C. 154(b) by 273 days.

(21) Appl. No.: 12/877,393

(22) Filed: Sep. 8, 2010

(65) Prior Publication Data

US 2011/0065473 A1 Mar. 17, 2011

(30) Foreign Application Priority Data

Sep. 17, 2009 (JP) ................................. 2009-216083

(51) Int. Cl.
*H01M 1/00* (2006.01)
(52) U.S. Cl.
USPC .......................................................... 702/151
(58) Field of Classification Search
USPC .......................................................... 702/151
See application file for complete search history.

(56) References Cited

U.S. PATENT DOCUMENTS 6,198,504 B1 * 3/2001 Nobuoka ................... 348/208.3
2010/0292915 A1 * 11/2010 Ishigami et al. .............. 701/200

FOREIGN PATENT DOCUMENTS

JP 2003-194558 7/2003

* cited by examiner

*Primary Examiner* — Tung S Lau
(74) *Attorney, Agent, or Firm* — Oblon, Spivak, McClelland, Maier & Neustadt, L.L.P.

(57) ABSTRACT

An angular velocity correction device includes a horizontal angular velocity detection unit to detect horizontal axis angular velocity, that is mounted on a main unit attached to a moving object that moves along a predetermined movement surface, and that is made up of angular velocity around the horizontal axis which is orthogonal to the advancing direction of the moving object, occurring according to the inclination angle of the movement surface; a correction value generating unit to generate a correction value for correcting the horizontal axis angular velocity, based on the horizontal axis angular velocity that satisfies predetermined horizontal determining conditions of the horizontal axis angular velocity in the past; and a correction unit to correct the horizontal axis angular velocity using the correction value.

9 Claims, 19 Drawing Sheets

ANGULAR VELOCITY CORRECTION DEVICE, ANGULAR VELOCITY CORRECTION METHOD, NAVIGATION DEVICE, AND CELLULAR PHONE HAVING NAVIGATION FUNCTION

BACKGROUND OF THE INVENTION

1. Field of the Invention

The present invention relates to an angular velocity correction device, angular velocity correction method, navigation device, and cellular phone having a navigation function, and for example can be favorably applied to a navigation device that can detect the inclination of a vehicle with an angular velocity sensor.

2. Description of the Related Art

Hitherto, navigation devices have been widely used which are mounted on vehicles or the like that move, calculate the current position based on a GPS (Global Positioning System) signal transmitted from a GPS satellite, and indicate the position of the vehicle and direction for advancing on a map screen.

Now, there are locations on actual roads which divide into multiple roads having mutually different inclinations and the mutual roads are near or overlapping in the horizontal direction, such as on/off ramps of a freeway in a city, for example.

Navigation devices have had difficulty determining the roads during advancing in such locations with only the current position calculated with GPS signals or the like.

Navigation devices have been proposed which use an acceleration sensor, angular velocity sensor, air pressure sensor and the like to calculate velocity and changes and so forth relating to the vertical direction of the vehicle, to select roads during advancing of the roads having mutually different inclinations and altitudes, based on these calculations (e.g. see Japanese Unexamined Patent Application Publication No. 2003-194558).

Also, besides navigation devices, portable electronic devices such as cellular phones for example have been proposed which have measuring functions, map display functions and so forth and mount an angular velocity sensor thereon, whereby roads can be selected during advancing of the roads having mutually different inclinations and altitudes.

SUMMARY OF THE INVENTION

Now, in the case of using the above-described angular velocity sensor, due to the nature of the angular sensor, a so-called offset component is included in the detection value thereof.

As a correction value for correcting the offset component, the navigation device can calculate an average value of the detected values obtained while the vehicle is stopped, for example, and set this as a correction value.

Also, in the case of an angular velocity sensor, the offset component can change with the temperature of the angular velocity sensor. Generally, a moving vehicle changes frequently according to time passed from the start of moving, the degree of incident sunlight, and so forth. Accordingly, the temperature within the vehicle and the temperature of the navigation device also changes frequently, whereby the temperature of the angular velocity sensor also frequently changes.

However, a vehicle moving on a freeway, for example, may be moving continuously for a relatively long period of time. In such a case, the navigation device may not update the correction values of the offset components, and the detection values of the angular velocity sensor has not been able to be appropriately corrected.

In such a case, the navigation device may not correctly determine the roads during advancing on roads having mutually different inclinations and altitudes, and an erroneous road may be selected and the map in the area thereof presented to the user.

It has been found desirable to provide an angular velocity correction device and angular velocity correction method which can accurately correct the detection values of the angular velocity sensor, and a navigation device and cellular phone with navigation functionality which increase the calculation accuracy of the current position.

An angular velocity correction device and angular velocity correction method according to an embodiment of the present invention detect the horizontal axis angular velocity that is made up of angular velocity around the horizontal axis which is orthogonal to the advancing direction of the moving object, occurring according to the inclination angle of the movement surface, with a horizontal angular velocity detection unit that is mounted on a main unit attached to a moving object that moves along a predetermined movement surface, generate a correction value for correcting the horizontal axis angular velocity, based on the horizontal axis angular velocity that satisfies predetermined horizontal determining conditions of the horizontal axis angular velocity in the past, with a correction value generating unit to, and correct the horizontal axis angular velocity using the correction value, with a correction unit.

Thus, the angular velocity correction device and angular velocity correction method can appropriately exclude the horizontal axis angular velocity that is obtained from a still hill or the like, is made up of a relatively large value, and does not represent only the offset components in all cases, and can accurately remove the offset components included in the horizontal axis angular velocity by using the correction values herein.

Also, a navigation device according to an embodiment of the present invention includes a measuring unit to measure the current position; a horizontal angular velocity detection unit that is mounted on a main unit attached to a moving object that moves along a predetermined movement surface, and that is to detect the horizontal axis angular velocity made up of angular velocity around the horizontal axis which is orthogonal to the advancing direction of the moving object, occurring according to the inclination angle of the movement surface; a correction value generating unit to generate a correction value for correcting the horizontal axis angular velocity, based on the horizontal axis angular velocity that satisfies predetermined horizontal determining conditions of the horizontal axis angular velocity in the past; a correction unit to correct the horizontal axis angular velocity using the correction values; an inclination information generating unit to generate inclination information representing the inclining state of the moving object as to the horizontal direction, based on the horizontal axis angular velocity corrected by the correction unit; and a map position calculation unit to calculate the position of the moving object on a map showing map information, based on measurement information measured by the measurement unit, map information that is stored in a predetermined storage unit and indicates the inclining state of the movement surface, and the inclination information.

Thus, the navigation device according to an embodiment of the present invention can appropriately exclude the horizontal axis angular velocity that is obtained from a still hill or the like, that is made up of a relatively large value, and that does not represent only the offset components in all cases, can generate correction values, and can use the horizontal axis angular velocity from which the offset components have been appropriately removed by using the correction values to accurately generate inclination information of the main unit. Thus, the navigation device according to an embodiment of the present invention can calculate the position of the main unit with high accuracy, based on the inclination information of the main unit and the inclination information included in the map information.

Also, a cellular phone having a navigation function according to an embodiment of the present invention includes: a measuring unit to measure the current position; a horizontal angular velocity detection unit that is mounted on a main unit attached to a moving object that moves along a predetermined movement surface, and that is to detect the horizontal axis angular velocity made up of angular velocity around the horizontal axis which is orthogonal to the advancing direction of the moving object, occurring according to the inclination angle of the movement surface; a correction value generating unit to generate a correction value for correcting the horizontal axis angular velocity, based on the horizontal axis angular velocity that satisfies predetermined horizontal determining conditions of the horizontal axis angular velocity in the past; an inclination information generating unit to generate inclination information representing the inclining state of the moving object as to the horizontal direction, based on the horizontal axis angular velocity corrected by the correction unit; a position calculation unit to calculate the position of the moving object on a map showing map information, based on measurement information measured by the measurement unit, map information that is stored in a predetermined storage unit and indicates the inclining state of the movement surface, and the inclination information; and a cellular phone unit to perform telephone call processing by performing wireless communication with a predetermined base station.

Thus, the navigation device according to an embodiment of the present invention can appropriately exclude the horizontal axis angular velocity that is obtained from a still hill or the like, that is made up of a relatively large value, and that does not represent only the offset components in all cases, can generate correction values, and can use the horizontal axis angular velocity from which the offset components have been appropriately removed by using the correction values to accurately generate inclination information of the main unit. Thus, the navigation device according to an embodiment of the present invention can calculate the position of the main unit with high accuracy, based on the inclination information of the main unit and the inclination information included in the map information.

According to the above configurations, the horizontal axis angular velocity that is obtained from a still hill or the like, that is made up of a relatively large value, and that does not represent only the offset components in all cases, can be appropriately excluded and correction values generated, and by using the correction values herein the offset components included in the horizontal axis angular velocity can be accurately removed. Thus, according to an embodiment of the present invention, an angular velocity correction device and angular velocity correction method that can correct the detection values of the angular velocity sensors with high accuracy can be realized.

Also, according to an embodiment of the present invention, the navigation device can appropriately exclude the horizontal axis angular velocity that is obtained from a still hill or the like, that is made up of a relatively large value, and that does not represent only the offset components in all cases, can generate correction values, and can use the horizontal axis angular velocity from which the offset components have been appropriately removed by using the correction values to accurately generate inclination information of the main unit. Thus, the navigation device according to an embodiment of the present invention can calculate the position of the main unit with high accuracy, based on the inclination information of the main unit and the inclination information included in the map information. Thus, according to embodiments of the present invention, a navigation device and a cellular phone having navigation function that can improve the calculation accuracy of the current position can be realized.

DESCRIPTION OF THE PREFERRED EMBODIMENTS

Figure 1:
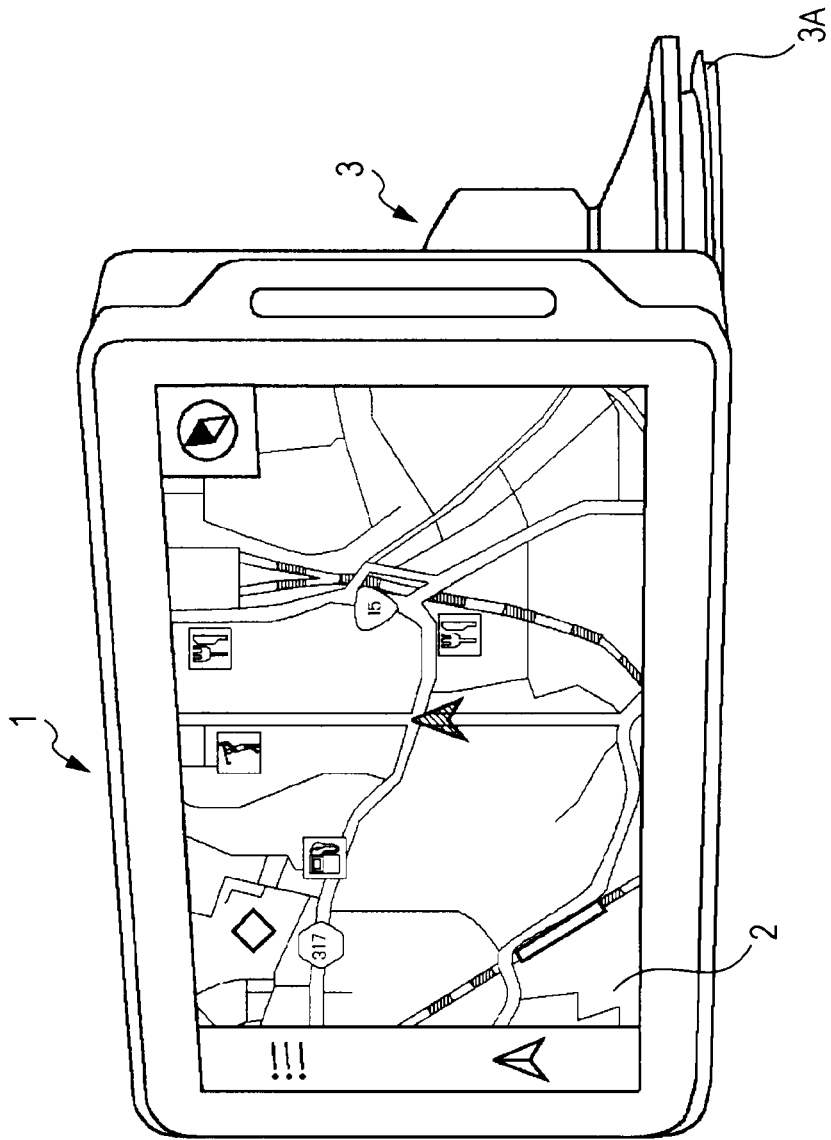
FIG. 1 is a schematic diagram illustrating an overall configuration of a PND.
Figure 2:
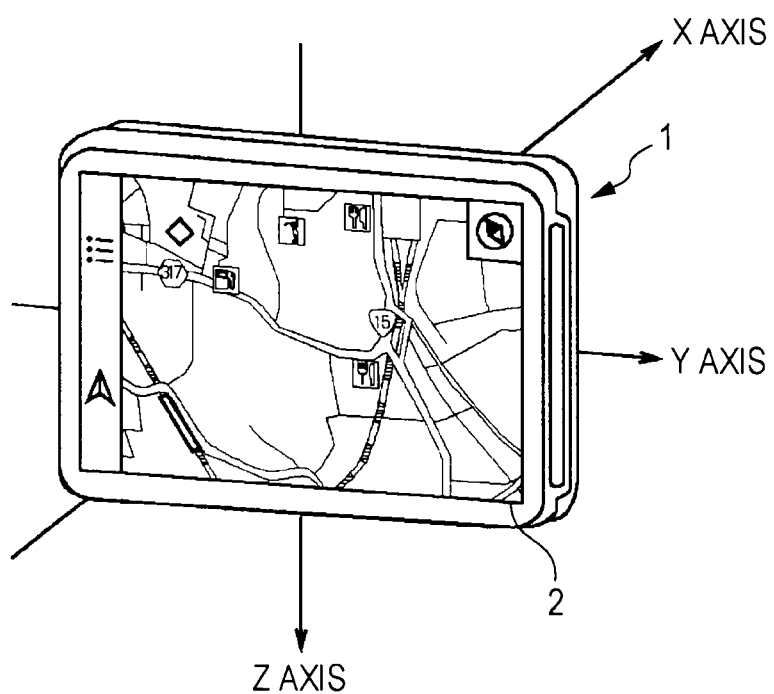
FIG. 2 is a schematic diagram illustrating a definition of a coordinate system of a PND.

Embodiments to carry out the invention (hereafter referred to simply as "embodiments") will be described with reference to the diagrams. Note that description will be given in the following order.
1. First Embodiment (PND)
2. Second Embodiment (cellular phone)
3. Other Embodiments
1. First Embodiment
1-1. Configuration of PND As shown in FIG. 1, a portable navigation device (hereafter also called PND (Personal Navigation Device)) 1 has a display unit 2 provided on the front side thereof. The PND 1 is made so as to display a map screen or the like according to map data stored in an internal non-volatile memory (unshown), for example, on a display unit 2, whereby the content thereof can be presented to a user.

Also, the PND 1 is held by a cradle 3 which is attached to a dashboard of a later-describe vehicle 9 via a suction cup 3A, and also the PND 1 and cradle 3 are connected mechanically and electrically.

Thus the PND 1 is operated by power supplied from a battery of the vehicle 9 via the cradle 9, and also when removed from the cradle 3, the PND 1 operates in an independent state by the power supplied from an internal battery.

Now, the PND 1 is disposed so that the display unit 2 thereof is roughly vertical as to the advancing direction of the vehicle 9. The coordinate system of the PND 1 at this time is displayed with the front/rear direction (advancing direction) of the vehicle 9 as the X-axis, the horizontal direction that is orthogonal to the X-axis as the Y-axis, and the vertical direction as the Z-axis.

With this coordinate system, the advancing direction of the vehicle 9 is defined as positive on the X-axis, the right direction defined as positive on the Y-axis, and the lower direction defined as positive on the Z-axis.

Figure 3:
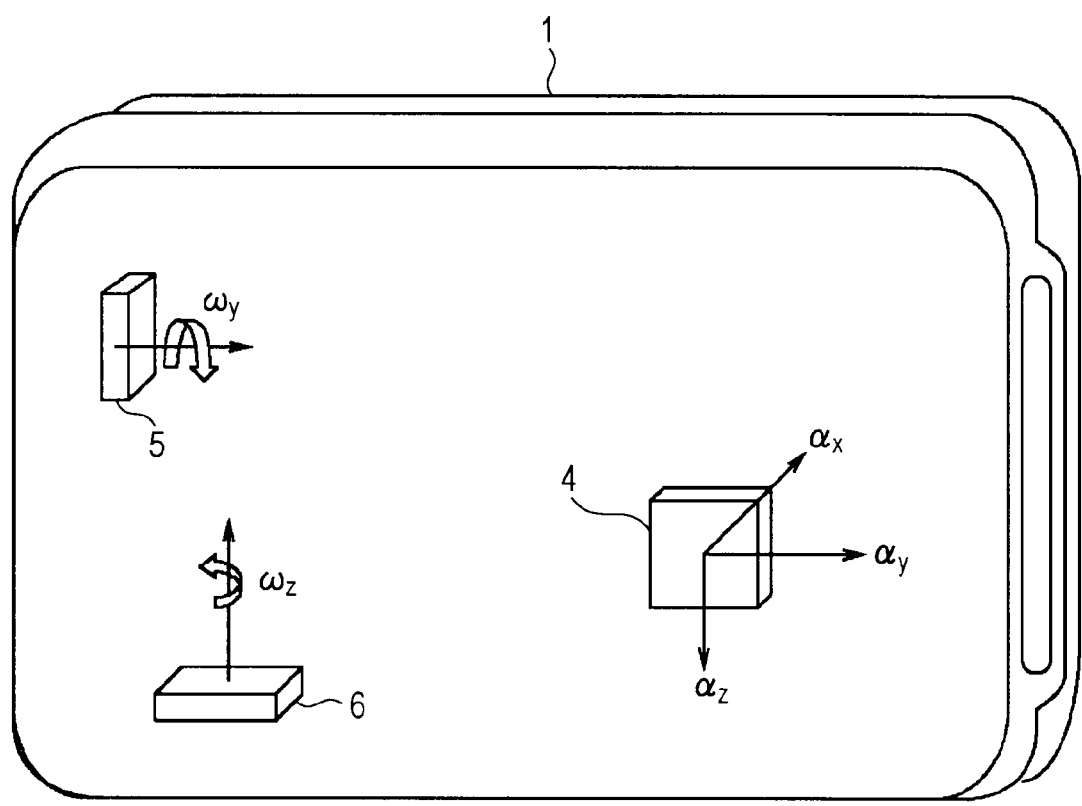
FIG. 3 is a schematic diagram illustrating a sensor configuration of a PND.

As shown in FIG. 3, the PND 1 is provided internally with a triaxial acceleration sensor 4, Y-axis gyro sensor 5, and Z-axis gyro sensor 6.

The triaxial acceleration sensor 4 is made so as to detect acceleration $\alpha_x$ along the X-axis, acceleration $\alpha_y$ along the Y-axis, and acceleration $\alpha_z$ along the Z-axis, respectively, as voltage values.

Also, the Y-axis gyro sensor 5 and Z-axis gyro sensor 6 are made so as to detect a pitch rate $\omega_y$ on the Y-axis, a yaw rate $\omega_z$ on the Z-axis, respectively, as voltage values.

Note that due to the nature of the Y-axis gyro sensor 5 and Z-axis gyro sensor 6, the voltage values detected by the Y-axis gyro sensor 5 and Z-axis gyro sensor 6 respectively have offset components included therein.

1-2. Computing Principles

Now, the PND 1 according to an embodiment of the present invention can also perform autonomous positioning processing to compute the current position after computing the velocity of the vehicle 9 serving as a moving object that moving along a road serving as a movement surface, based on the acceleration and pitch rate and so forth detected by the triaxial acceleration sensor 4, Y-axis gyro sensor 5, and so forth. Now, the basic principles for computing the velocity and current position will be described.

1-2-1. Velocity Computing Principles

Figure 4A:
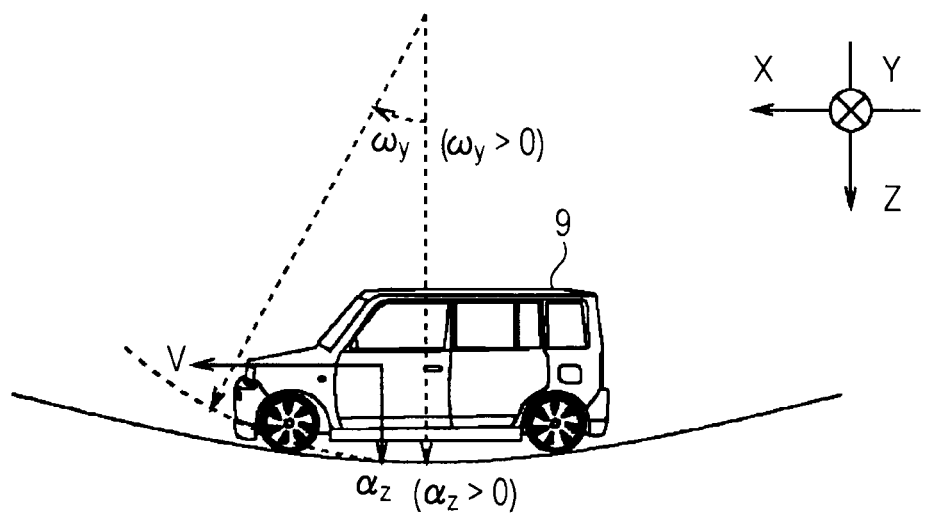
FIGS. 4A and 4B are schematic diagrams illustrating a state at time of driving on an uneven road surface.
Figure 4B:
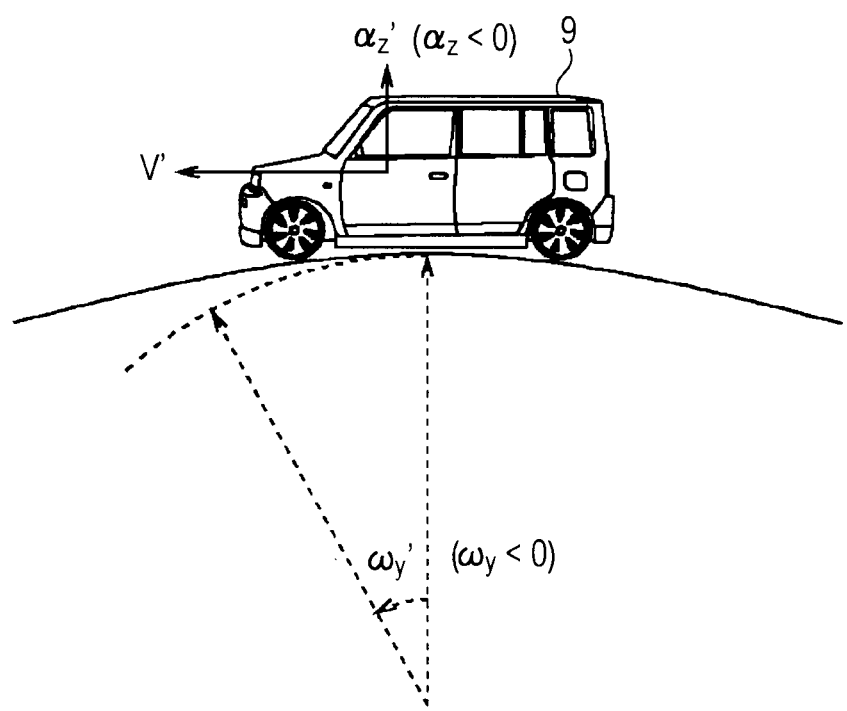

In actual practice, the vehicle 9 rarely is operated on a smooth road, and in reality the vehicle 9 is operated on an overall concave-shaped road such as shown in FIG. 4A and an overall convex-shaped road such as shown in FIG. 4B.

When the vehicle 9 is operated on a concave-shaped road (FIG. 4A), the PND 1 mounted on the dashboard of the vehicle 9 detects the acceleration $\alpha_z$ in the downward direction along the Z-axis by the triaxial acceleration sensor 4 (FIG. 3), with a sampling frequency of 50 Hz, for example.

Also, the PND 1 detects the angular velocity (hereafter also called the pitch rate) $\omega_y$ on the Y-axis which is orthogonal to the advancing direction by the Y-axis gyro sensor 5 (FIG. 3), with a sampling frequency of 50 Hz.

Now, the PND 1 defines the acceleration $\alpha_z$ of the downward direction along the Z-axis as positive, and also defines the pitch rate $\omega_y$ in the event of upwards vertical rotation as to the advancing direction in a virtual circle formed along the concave-shaped road surface, such as shown in FIG. 4A, as positive.

The PND 1 uses the acceleration $\alpha_z$ detected by the triaxial acceleration sensor 4 and the pitch rate $\omega_y$ detected by the Y-axis gyro sensor 5 to enable computing the velocity V in the advancing direction 50 times per second by the following Expression (1).

$$V = \frac{\alpha_z}{\omega_y} \quad (1)$$

Also, when the vehicle 9 is operated on a convex-shaped road (FIG. 43), the PND 1 detects the acceleration $\alpha_z$ in the upward direction along the Z-axis by the triaxial acceleration sensor 4, with a sampling frequency of 50 Hz, for example, and also detects the pitch rate $\omega_y'$ on the Y-axis by the Y-axis gyro sensor 5, with a sampling frequency of 50 Hz, for example.

The PND 1 uses the acceleration $\alpha_z'$ detected by the triaxial acceleration sensor 4 and the pitch rate $\omega_y'$ detected by the Y-axis gyro sensor 5 to enable computing the velocity V' in the advancing direction 50 times per second by the following Expression (2).

$$V' = \frac{\alpha_z'}{\omega_y'} \quad (2)$$

For ease of description, the negative acceleration $\alpha_z$ will be described as $\alpha_z'$, but actually the triaxial acceleration sensor detects the acceleration $\alpha_z'$ as a negative value of the acceleration $\alpha_z$. Also, similarly for the pitch rate $\omega_y'$, the negative pitch rate $\omega_y$ will be described as pitch rate $\omega_y'$, but actually the Y-axis gyro sensor 5 detects the pitch rate $\omega_y'$ as a negative value of the pitch rate $\omega_y$. Accordingly, the velocity V' is also actually computed as velocity V.

1-2-2. Current Position Computing Principles

Next, current position computing principles to compute the current position based on the velocity V computed by the above-described velocity computing principles and the angular velocity around the Z-axis will be described.

Figure 5:
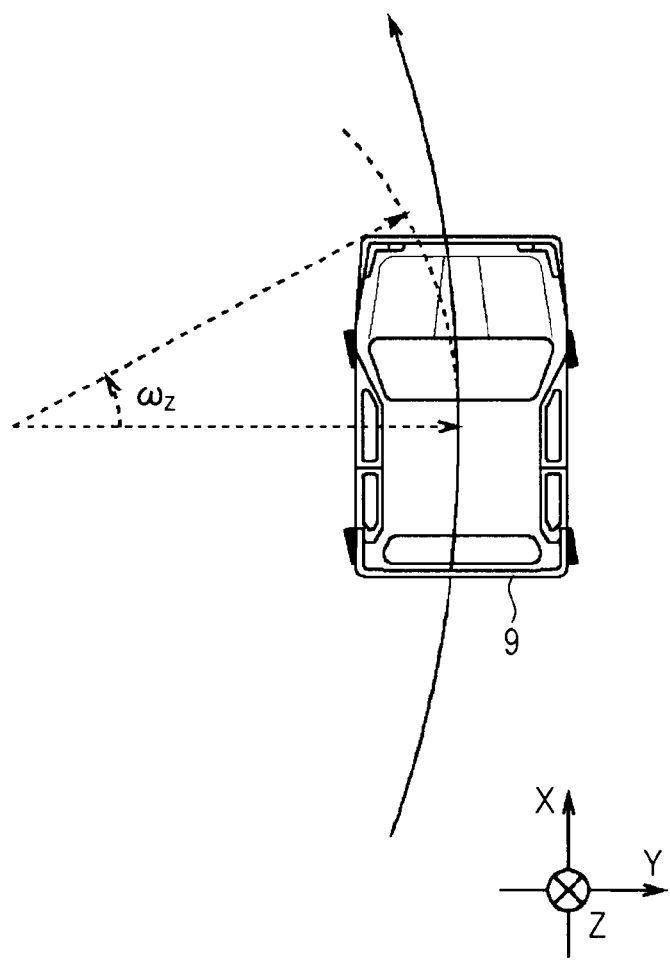
FIG. 5 is a schematic diagram illustrating a state at the time of driving around a curve.

As shown in FIG. 5, the angular velocity (yaw rate) $\omega_z$ around the Z-axis at the time that the vehicle 9 is turning in a counter-clockwise direction, for example, is detected by the Z-axis gyro sensor 6 (FIG. 3) with a sampling frequency of 50 Hz, for example.

Next, the PND 1 obtains the amount of change from the previous position P0 to the current position P1, based on the velocity V at the previous position P0 and an angle θ obtained by multiplying the yaw rate $\omega_z$ detected by the gyro sensor by the sampling frequency (in this case, 0.02 seconds). The PND 1 can then compute and obtain the current position P1 by adding the amount of change thereof to the previous position P0.

1-3. Circuit Configuration of PND

Figure 7:
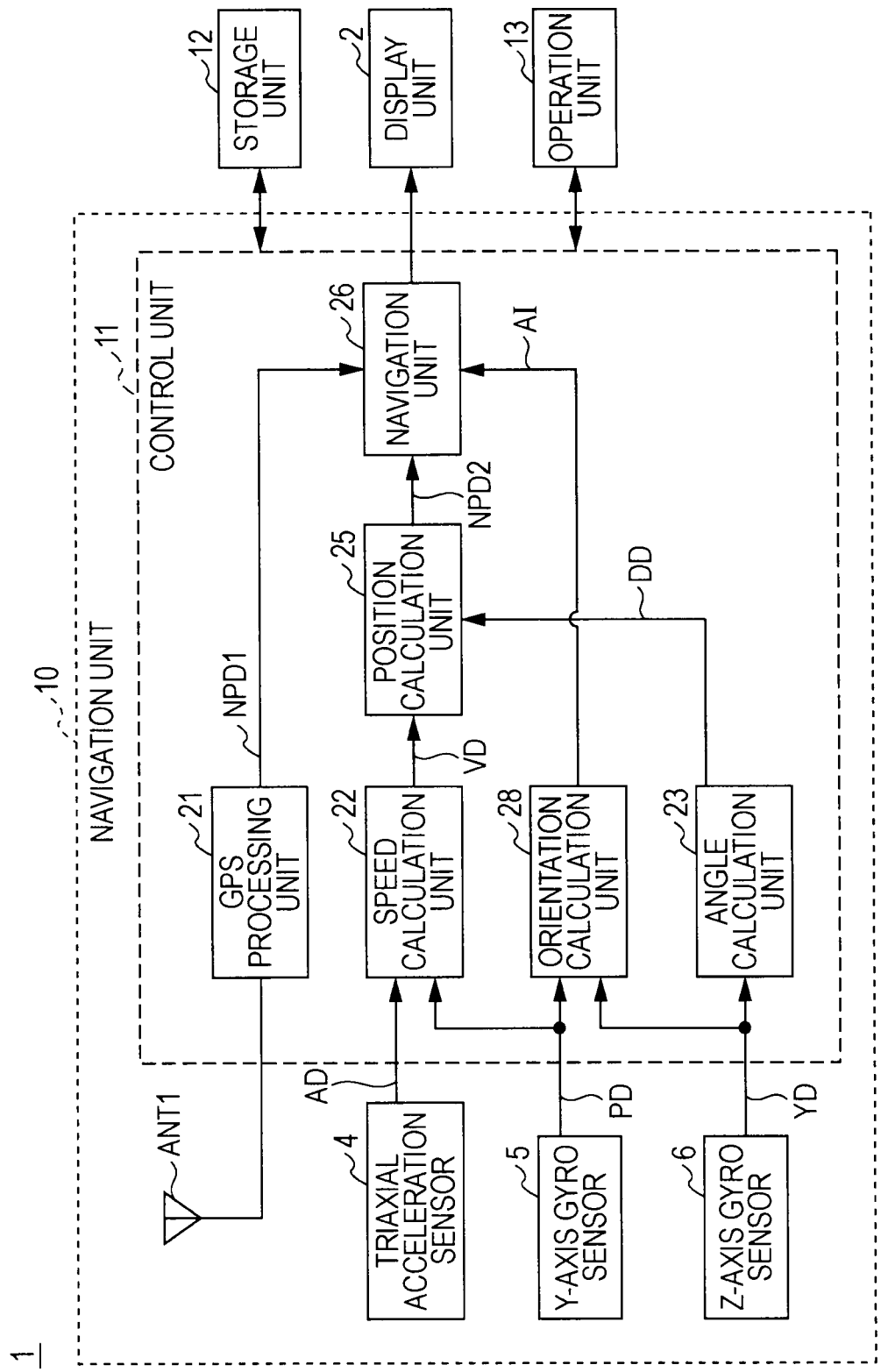
FIG. 7 is a schematic diagram illustrating a PND circuit configuration.

As shown in FIG. 7, the PND 1 is configured around a control unit 11 and a navigation unit 10 that is provided with various types of sensors and realizes navigation functions.

The control unit 11 is made up of a CPU (Central Processing Unit), and performs centralized control of the entire device following a basic program read out from a storage unit 12 made up of a non-volatile memory, for example.

Also, the PND 1 executes later-described current position computing processing and inclination information generating processing and the like, according to various types of application programs read out by the control unit 11 from the storage unit 12.

Further, the PND1 has an operating unit 13 made up of a touch panel that is integrated with the display unit 2, an unshown power switch, and so forth. Upon receiving operating instruction from the user via the touch panel or power switch or the like, the operating unit 13 notifies the operating content thereof to the control unit 11.

The control unit 11 is made so as to perform processing according to the user operating content such as setting a destination and so forth, according to the operating content notified from the operating unit 13.

In the case of performing navigation processing, the control unit 11 functions as a GPS processing unit 21, velocity calculation unit 22, angle calculation unit 23, position calculation unit 25, navigation unit 26, and inclination calculation unit 28.

In the case of being able to receive a GPS signal from a GPS satellite, the control unit 11 can perform GPS measuring processing for measuring based on the GPS signal thereof.

That is to say, the PND 1 transmits the multiple GPS signals from the GPS satellites received by a GPS antenna ANT1 to the GPS processing unit 21 of the control unit 11.

The GPS processing unit 21 obtains current position data NPD 1 by accurately measuring the current position of the vehicle 9 based on the equator data obtained by demodulating multiple GPS signals and distance from the multiple GPS satellites to the vehicle 9, and transmits this to the navigation unit 26.

The navigation unit 26 reads out, from the storage unit 12, map data of the surroundings which includes the current position of the vehicle 9, based on the current position data NPD 1, and generates a map image which includes the current position thereof, after which this is output to the display unit 2, thereby displaying the map image.

Also, the PND 1 does not perform GPS measuring processing when a GPS signal is not received from the GPS satellite. Thus, primarily when the GPS signal is not received, the PND 1 can perform autonomous positioning processing to compute the current position after computing the velocity V, based on the acceleration and pitch rate and so forth detected by the triaxial acceleration sensor 4, Y-axis gyro sensor 5, and so forth.

That is to say, the triaxial acceleration sensor 4 detects the accelerations $\alpha_x$, $\alpha_y$, and $\alpha_z$ with a sampling frequency of 50 Hz, for example, and of the accelerations $\alpha_x$, $\alpha_y$, and $\alpha_z$, acceleration data AD showing the acceleration $\alpha_z$ is transmitted to the velocity calculation unit 22 of the control unit 11.

The Y-axis gyro sensor 5 detects the pitch rate $\omega_y$ with a sampling frequency of 50 Hz, for example, and the pitch rate data PD showing the pitch rate $\omega_y$ is transmitted to the velocity calculation unit 22 of the control unit 11.

The velocity calculation unit 22 computes the velocity V 50 times per second using the Expression (1), based on the acceleration $\alpha_z$ which corresponds to the acceleration data AD supplied from the triaxial acceleration sensor 4, and the pitch rate $\omega_y$ which corresponds to the pitch rate data PD supplied from the Y-axis gyro sensor 5, and transmits the velocity data VC showing the velocity V to the position computing unit 25.

Also, the Z-axis gyro sensor 6 detects the yaw rate $\omega_y$ with a sampling frequency of 50 Hz, for example, and the yaw rate data YD showing the yaw rate $\omega_z$ is transmitted to the angle computing unit 23 and inclination calculating unit 28 of the control unit 11.

The angle calculation unit 23 multiplies the sampling frequency (in this case, 0.02 seconds) by the yaw rate wz which corresponds to the yaw rate data YD supplied from the Z-axis gyro sensor 6, thereby computing the angle θ at the time of a clockwise or counter-clockwise turn by the vehicle 9, and transmits the angle data DD showing the angle θ to the position calculation unit 25.

Figure 6:
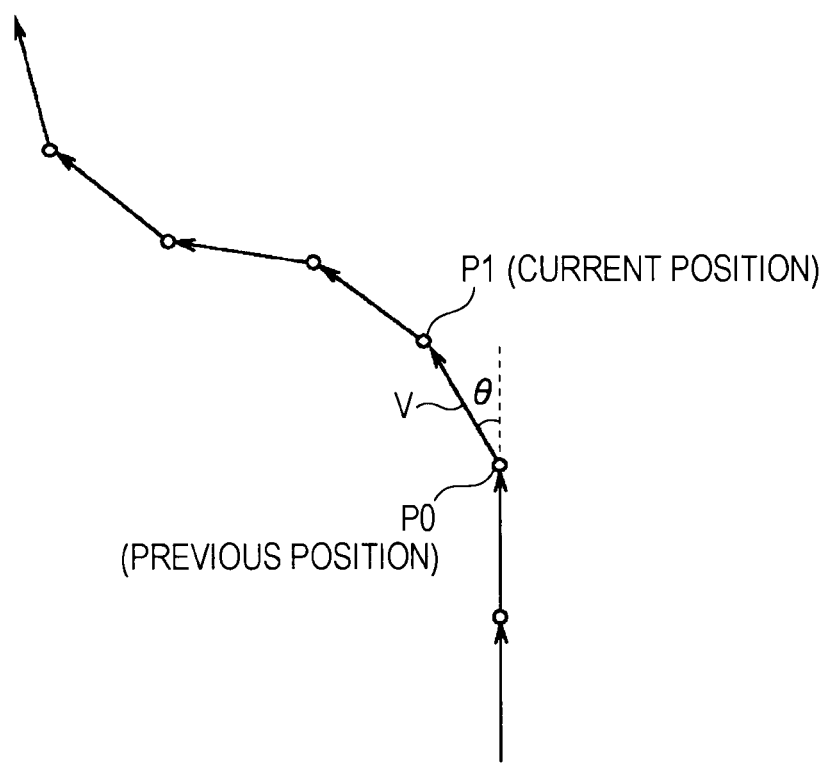
FIG. 6 is a schematic diagram illustrating a current position computing method using velocity and angle.

The position calculation unit 25 finds the amount of change from the previous position P0 such as shown in FIG. 6 to the current position P1, based on the angle θ which corresponds to the angle data DD supplied from the angle calculation unit 23 and velocity V which corresponds to the velocity data VD supplied from the velocity calculation unit 22.

The position computing unit 25 then computes the current position P1 by adding the amount of change there to the previous position P0, and transmits the current position data NPD 2 showing the current position P1 thereof to the navigation unit 26.

On the other hand, the inclination calculating unit 28 generates inclination information AI which represents the state of the inclination of the PND 1, based on the pitch rate data PD from the Y-axis gyro sensor 5 and the yaw rate data YD from the Z-axis gyro sensor 6, and supplies this to the navigation unit 26 (details to be described later).

Now, the inclination information AI represents whether the road that the vehicle 9 is traveling on is "flat", indicating that the road is nearly flat, "incline", indicating an upward hill, or "decline", indicating a downward hill.

The navigation unit 26 reads out, from the storage unit 12, map data of the surroundings which includes the current position of the vehicle 9, based on the current position data NPD 1 supplied from the GPS processing unit 21 and the current position data NPD 2 which is supplied from the position calculation unit 25.

Now, if the current position of the vehicle 9 is at a branching point of multiple roads having differing inclinations and height mutually, or in the vicinity thereof (hereafter this is called inclination branching locations), based on the read out map data, one of the roads will be selected based on the inclination information AI.

The navigation unit 26 sets the current position on the selected road, and after generating a map image including the current position thereof, outputs this to the display unit 2, thereby displaying the map image.

Thus the PND 1 generates a map image which includes the surroundings of the current position of the vehicle 9, based on the current position data NPD 1 based on the GPS signals or the current position data NPD 2 generated based on the detection values of the various sensors, after which this is output to the display unit 2.

At this time if the vehicle 9 is positioned at an inclination branching location, the PND 1 selects one of the roads of the roads at the inclination branching location and sets the current position on this road, based on the inclination information AI.

1-4. Velocity Calculation Processing

Next, velocity calculation processing to calculate the velocity V with the velocity calculation unit 22, based on the acceleration $\alpha_z$ which corresponds to the acceleration data AD supplied from the triaxial acceleration sensor 4 and the pitch rate $\omega_y$ which corresponds to the pitch rate data PD supplied from the Y-axis gyro sensor 5, will be described.

Figure 8:
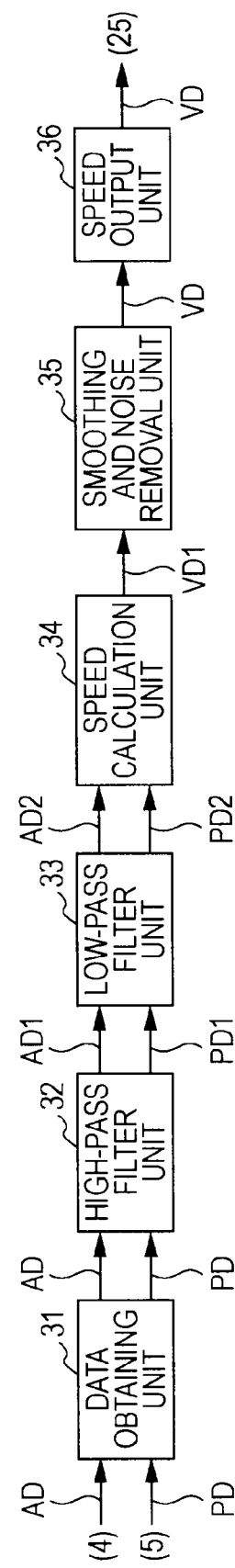
FIG. 8 is a schematic diagram illustrating a configuration of a velocity calculation unit.

In the event of executing velocity calculation processing, the velocity calculation unit 22 functions as a data obtaining unit 31, high-pass filter unit 32, low-pass filter unit 33, velocity calculation unit 34, smoothing and noise removal unit 35, and velocity output unit 36 as shown in FIG. 8.

The data obtaining unit 31 of the velocity calculation unit 22 obtains the acceleration data AD supplied from the triaxial acceleration sensor 4 and the pitch rate data PD supplied from the Y-axis gyro sensor 5, and transmits the acceleration data AD and pitch rate data PD to the high-pass filter unit 32.

The high-pass filter unit 32 cuts the direct current components of the acceleration data AD and pitch rate data PD supplied from the data obtaining unit 31, and transmits the acceleration data AD1 and pitch rate data PD1 obtained as a result thereof to the low-pass filter unit 33.

The low-pass filter unit 33 performs later-described low-pass filter processing as to the acceleration data AD1 and pitch rate data PD1 supplied from the high-pass filter unit 32, and transmits the acceleration data AD2 and pitch rate data PD2 obtained as a result thereof to the velocity calculation unit 34.

The velocity calculation unit 34 performs later-described velocity calculation processing as to the acceleration data AD2 and pitch rate data PD2 supplied from the low-pass filter unit 33, and transmits the velocity data VD1 obtained as a result thereof to the smoothing and noise removal unit 35.

The smoothing and noise removal unit 35 performs predetermined smoothing and noise removal processing as to the velocity data V1 supplied from the velocity calculation unit 34, reduces the error difference included in the velocity V, and transmits the velocity data VD obtaining as a result thereof to the velocity output unit 36.

The velocity output unit 36 transmits the velocity data VD supplied from the smoothing and noise removal unit 35 to the position calculation unit 25.

Thus, the velocity calculation unit 22 calculates the velocity V of the vehicle 9 based on the acceleration data AD supplied from the triaxial acceleration sensor 4 and the pitch rate data PD supplied from the Y-axis gyro sensor 5.

1-4-1. Low-pass Filter Processing

Next, the low-pass filter processing performed by the low-pass filter unit 33 as to the acceleration data AD1 and pitch rate data PD1 supplied from the high-pass filter unit 32 will be described.

As described above, with the PND 1 mounted on the vehicle 9, the pitch rate $\omega_y$ resulting from the undulation of the road surface in the advancing direction of the vehicle 9 is detected by the Y-axis gyro sensor 5.

While details will be omitted, as a result of an experiment, it has been shown that with the PND 1 at this time, the pitch rate $\omega_y$ is detected as a vibration of 1 to 2 Hz regardless of the driving velocity of the vehicle 9.

Figure 9:
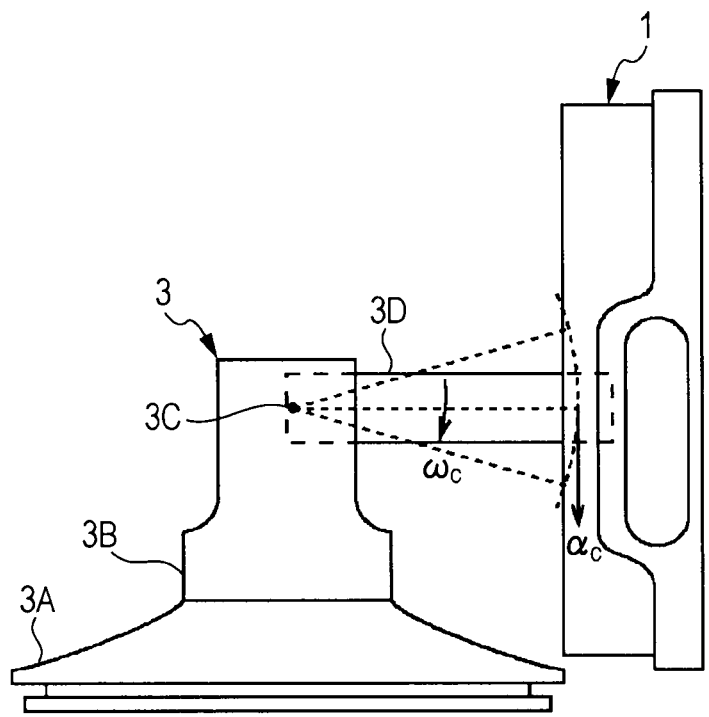
FIG. 9 is a schematic diagram illustrating a state of vibration from a cradle.
Figure 10:
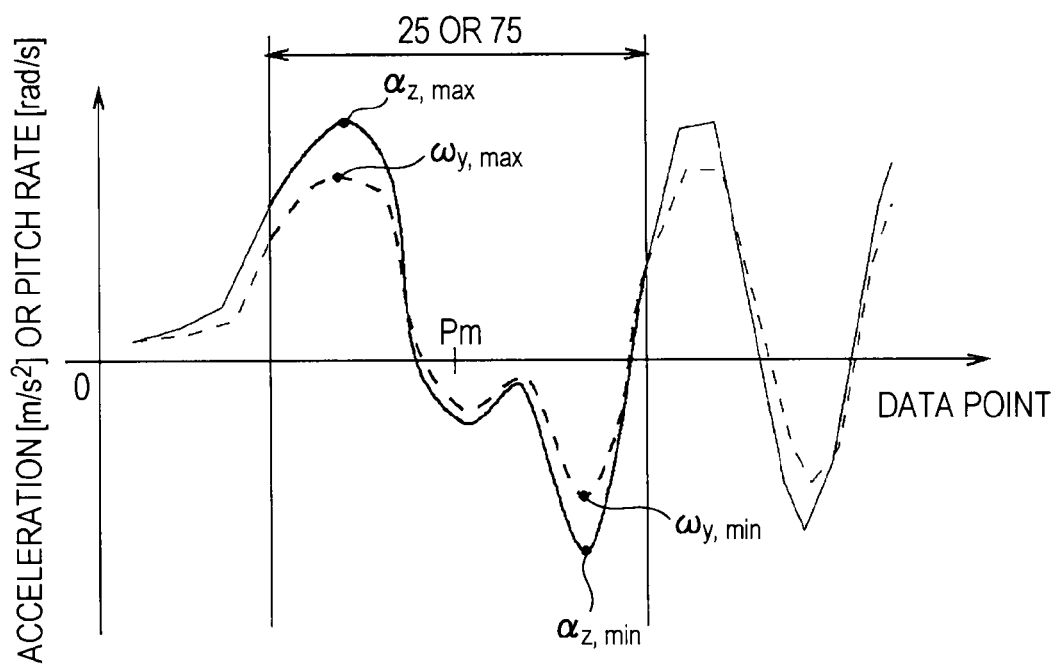
FIG. 10 is a schematic diagram illustrating the relation between maximum value and minimum value.

Now, the PND1 is held by the cradle 3 which is attached to the dashboard of the vehicle 9 via a suction cup 3A. As shown in FIG. 9, the cradle 3 has a cradle main unit 3B provided above the suction cup 3A, one end thereof is supported by a bearing point 3C provided at a position at a predetermined height on the cradle main unit 3B, and a PND bearing unit 3D is provided to support the PND 1 with the other end.

Therefore, in the event that the vehicle 9 vibrates according to the undulation of the road surface, the PND 1 vibrates with acceleration $\alpha_c$ and angular velocity $\omega_c$ for example, in the vertical direction with the bearing point 3C of the PND bearing unit 3D as the center thereof.

As a result of experiments and the like, the PND 1 has been confirmed to detect, with the Y-axis gyro sensor 5, the pitch rate $\omega_y$ which vibrates at 1 to 2 Hz according to the undulation of the road surface as described above, and added angular velocity $\omega_{cy}$ that is synthesized with the angular velocity $\omega_z$ which receives vibrations of approximately 15 Hz from the cradle.

Also confirmed is that the PND 1 detects, with the triaxial acceleration sensor 4, the acceleration $\alpha_z$ which vibrates at 1 to 2 Hz according to the undulation of the road surface as described above, and added acceleration $\alpha_{cz}$ that is synthesized with the acceleration $\alpha_c$ which receives vibrations of approximately 15 Hz from the cradle.

Thus the low-pass filter unit 33 performs low-pass filter processing as to the acceleration data AD 1 and pitch rate data PD 1 supplied from the high-pass filter unit 32, and removes the 15 Hz frequency components, i.e. each of the acceleration $\alpha_c$ and angular velocity $\omega_c$ which occur from the PND 1 being held by the cradle 3.

That is to say, by removing the acceleration $\alpha_c$ from the added acceleration $\alpha_{cz}$, the low-pass filter unit 33 can extract only the acceleration $\alpha_z$ which occurs from the undulation of the road surface. Also, by removing the angular velocity $\omega_c$ from the added angular velocity $\omega_{cy}$, the low-pass filter unit 33 can extract only the pitch rate $\omega_y$ which occurs from the undulation of the road surface.

1-4-2. Velocity Calculation Processing

Next, the velocity calculation processing to calculate the velocity V with the velocity calculation unit 34, based on the acceleration data AD2 and pitch rate data PD2 supplied from the low-pass filter unit 33, will be described.

Generally, for a position to mount the PND 1 in the vehicle 9, various locations may be considered, such as on the dashboard which the front side of the vehicle 9 or near the rear windshield which is on the rear side of the vehicle 9, for example.

While details will be omitted, as a result of experimenting, it has been shown that with the PND 1 at this time, the phase of the acceleration $\alpha_z$ detected with the PND 1 mounted on the rear side of the vehicle 9 is delayed as compared to the acceleration $\alpha_z$ detected with the PND 1 mounted on the front side. Thus, the PND 1 uses data in a certain range of the pitch rate data PD2.

Now, in the case that the velocity V of the vehicle 9 is a slow velocity, the acceleration $\alpha_z$ and pitch rate $\omega_y$ change suddenly due to minor changes in the road surface. Thus the velocity calculation unit 34 sets the range of the data to be used to 25 data point, i.e. sets a narrow range, to handle the sudden changes thereof.

Also, in the case that the velocity V of the vehicle 9 is a high velocity, influence from the suspension of the vehicle 9 is great, and the acceleration $\alpha_z$ and pitch rate $\omega_y$ change slowly. Thus, in order to handle the slow changes, the velocity calculation unit 34 sets the data range to be used to be 75 data points, i.e. sets a wide range.

Specifically, the velocity calculation unit 34 extracts a maximum value and minimum value from the range of 25 data points or 75 data points centered by a data point Pm corresponding to the previous position P0 (FIG. 6) of the acceleration $\alpha_z$ which corresponds to the acceleration data AD2 supplied from the low-pass filter unit 33, as a maximum acceleration $\alpha_{z,max}$ and minimum acceleration $\alpha_{z,min}$ respectively.

Also, the velocity calculation unit 34 extracts a maximum value and minimum value from the range of 25 data points or 75 data points centered by a data point Pm of the pitch rate $\omega_y$ which corresponds to the pitch rate data PD2 supplied from the low-pass filter unit 33, as a maximum pitch rate $\omega_{y,max}$ and minimum pitch rate $\omega_{y,min}$.

That is to say, the velocity calculation unit 34 extracts, from a range wider than the phase shift that can occur in the acceleration $\alpha_z$ and pitch rate $\omega_y$, the maximum acceleration $\omega_{z,\,max}$ and minimum acceleration $\alpha_{z,\,min}$ and the maximum pitch rate $\omega_{y,\,max}$ and minimum pitch rate $\omega_{y,\,min}$, respectively.

The velocity calculation unit 34 uses the maximum acceleration $\alpha_{z,\,max}$ and minimum acceleration $\alpha_{z,\,min}$ extracted from the acceleration data AD2 and the maximum pitch rate $\omega_{y,\,max}$ and minimum pitch rate $\omega_{y,\,min}$ extracted from the pitch rate data PD2 to compute the velocity V in the advancing direction at the previous position P0 (FIG. 3) with the Expression (3) which is a modification of the above-described Expression (1).

$$V = \frac{\alpha_{z,max} - \alpha_{z,min}}{\omega_{y,max} - \omega_{y,min}} \quad (3)$$

Subsequently the velocity calculation unit 34 transmits the velocity data VD1 representing the velocity V to the smoothing and noise removal unit 35.

That is to say, even in the case that a phase shift is occurring in the acceleration $\alpha_z$ and pitch rate $\omega_y$, by using the Expression (3) the velocity calculation unit 34 can calculate the velocity V with the phase shift influences removed.

Thus the velocity calculation unit 34 can reflect the state of the road surface and vehicle 9 according to the velocity V, by switching between the data ranges according to the velocity V of the vehicle 9 in the event of extracting the maximum acceleration $\alpha_{z,\,max}$ and minimum acceleration $\alpha_{z,\,min}$, and the maximum pitch rate $\omega_{y,\,max}$ and minimum pitch rate $\omega_{y,\,min}$, thereby enabling improved calculation accuracy of the velocity V.

Figure 11:
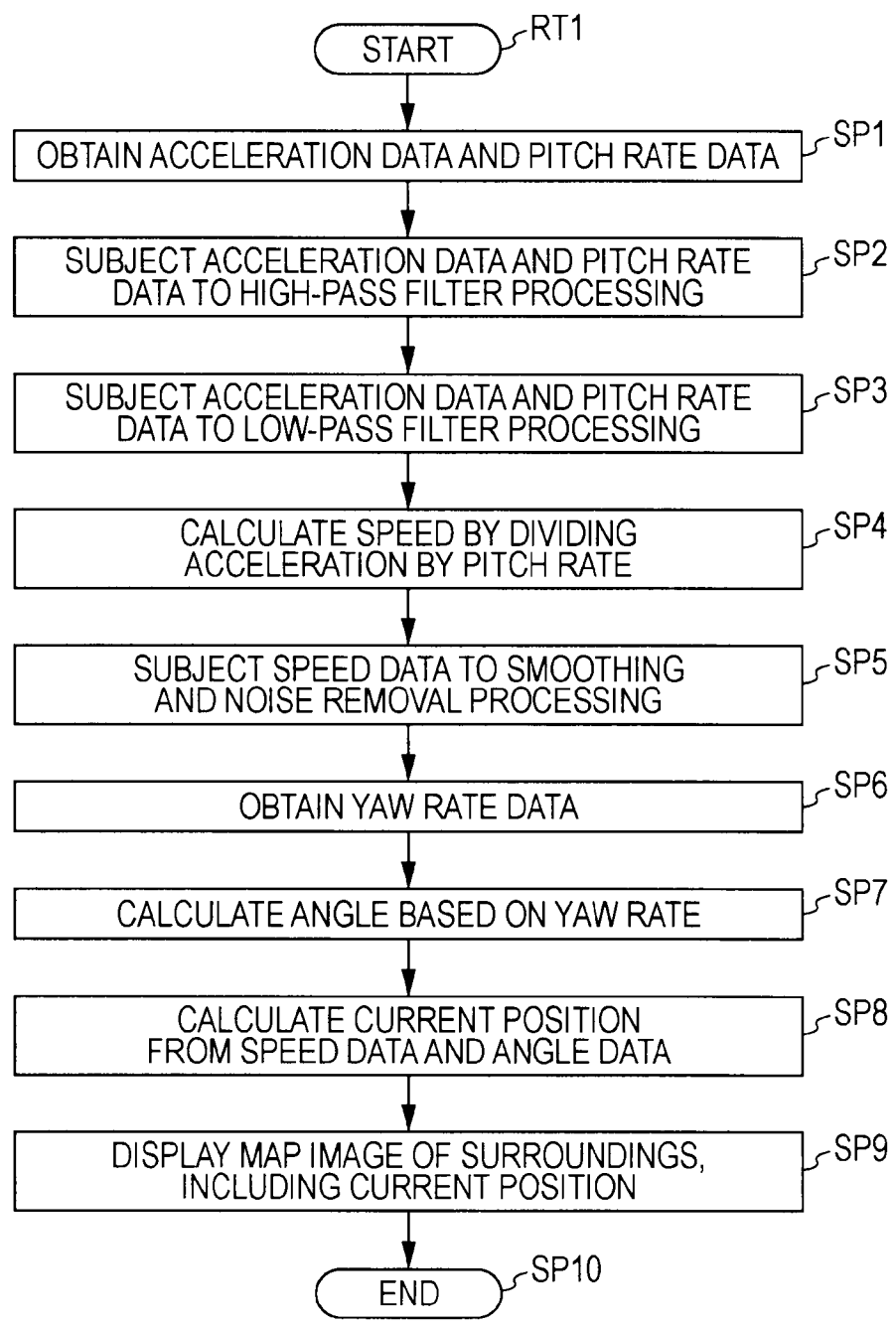
FIG. 11 is a flowchart to accompany description of current position computing processing procedures which uses the velocity computing processing.

1-4-3. Position Calculating Processing Procedures Using Velocity Calculation Processing Next, current position calculating processing procedures for the control unit 11 of the PND 1 to calculate the current position using a velocity calculation processing such as described above will be described with reference to the flowchart in FIG. 11.

In actual practice, the control unit 11 enters from the starting step of a routine RT1 and advances to step SP1, and obtains the acceleration data AD detected by the triaxial acceleration sensor 4 and the pitch rate data PD detected by the Y-axis gyro sensor 5 with the data obtaining unit 31 of the velocity calculation processing unit 22, and subsequently advances to the following step SP2.

In step SP2 the control unit 11 performs high-pass filter processing as to the acceleration data AD and pitch rate data PD with the high-pass filter unit 32 of the velocity calculation processing unit 22, and advances to the following step SP3.

In step SP3 the control unit 11 performs low-pass filter processing which is a 4th order IIR filter with a cut-off frequency of 1 Hz, for example, as to the acceleration data AD1 and pitch rate data PD1 subjected to high-pass filter processing, with the low-pass filter unit 33 of the velocity calculation unit 22, and advances to the following step SP4.

In step SP4 the control unit 11 calculates the velocity V by the velocity calculation unit 34 of the velocity calculation unit 22, using the Expression (3), based on the acceleration $\alpha_z$ which corresponds to the acceleration data AD2 and the pitch rate $\omega_y$ which corresponds to the pitch rate data PD2 that are subjected to low-pass filter processing, and advances to the following step SP5.

In step SP5 the control unit 11 performs smoothing and noise removal processing as to the velocity data VD which indicates the velocity V calculated in step SP4.

Specifically, the control unit 11 performs low-pass filter processing which has caused the cut-off frequency to be variable as to the velocity data VD1 which indicates the velocity V calculated in step SP4, and advances to the following step SP6.

In step SP6 the control unit 11 obtains yaw rate data YD detected by the Z-axis gyro sensor 6 with the angle calculation unit 23, and advances to the following step SP7.

In step SP7 the control unit 11 multiplies the yaw rate $\omega_z$ which corresponds to the yaw rate data YD by 0.02 seconds which is a sampling frequency, thereby calculating the angle data DD which indicates the angle $\theta$ with the angle calculation unit 23, and advances to the following step SP8.

In step SP8 the control unit 11 calculates the current position data NPD2 based on the velocity data VD subjected to smoothing and noise reduction processing in step SP5 and the angle data DD calculated in step SP8, and advances to the following next SP9.

In step SP9 the control unit 11 reads out map data of the surroundings which includes the current position of the vehicle 9, based on the current position data NPD 2 which is supplied from the position calculation unit 25, and generates a map image which includes the current position thereof. Subsequently the control unit 11 outputs the generated map image to the display unit 2, advances to the following step SP10, and ends the series of processing.

1-5. Generating Inclination Information

Next, inclination calculation processing to calculate the inclination information AI representing the inclining state of the PND 1 with the slop calculation unit 28, based on the pitch rate data PD supplied from the Y-axis gyro sensor 5 (FIG. 7)

1-5-1. Generating Basic Inclination Information

Figure 12:
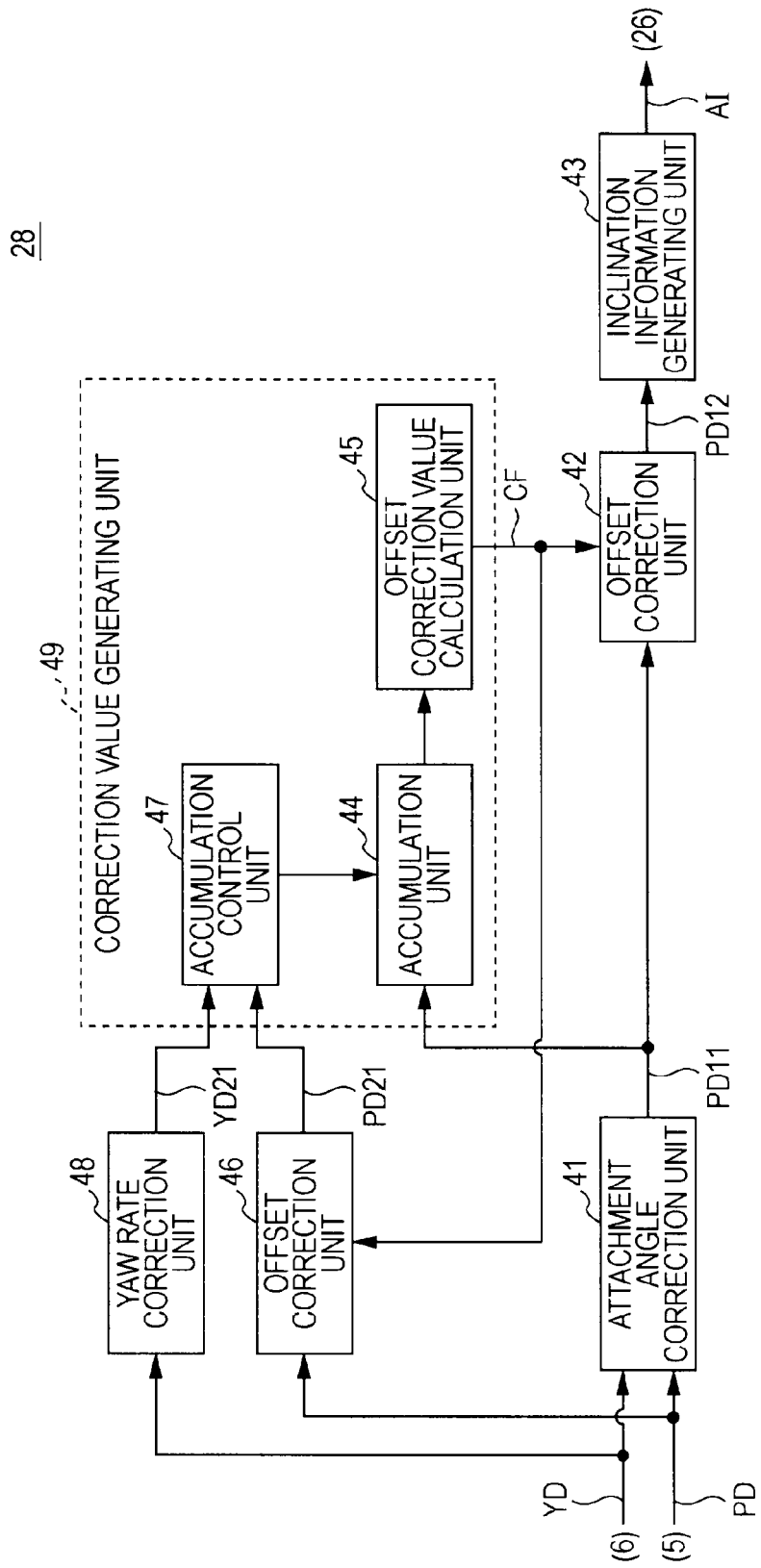
FIG. 12 is a schematic diagram illustrating a configuration of an inclination calculation unit.

First, basic generating processing of the inclination information AI by the inclination calculation unit 28 will be described. The inclination calculation unit 28 is make up of various function blocks such as shown in FIG. 12, and supply the pitch rate data PD and yaw rate data YD to an attachment angle correction unit 41.

Now, as described above, the PND 1 is installed so that the display unit 2 is approximately vertical as to the advancing direction of the vehicle 9, but in reality is not completely vertical, and often has a certain amount of inclining. This inclining is called the attachment angle.

In the case of such an inclining, angular velocity components other than the pitch rate $\omega_y$, such as the yaw rate co, and so forth, are included in the pitch rate data PD, for example.

Also, error components (offset components) from offsets that occur due to the nature of the Y-axis gyro sensor 5, as described above, are also included in the pitch rate data PD.

The attachment angle correction unit 41 first corrects the pitch rate data PD using the yaw rate data YD. Thus, the attachment angle correction unit 41 offsets the angular velocity components other than the yaw rate $\omega_z$ and the like included in the pitch rate data PD, to generate pitch rate data PD 11, and supplies this to an offset correction unit 42.

The pitch rate data PD 11 has offset the error components originating from the angular velocity, and this becomes data including the offset components in addition to the pitch rate $\omega_y$.

The offset correction unit 42 uses an offset correction value CF computed by a later-described offset correction value calculation unit 45 to correct the offset components included in the pitch rate data PD11.

Specifically, the correction unit 42 generates the pitch rate data PD 12 by subtracting the offset correction value from the pitch rate data PD 11, and supplies this to the inclination information generating unit 43.

The pitch rate data PD 12 offsets both the error components originated from the angular velocity, and the error components (offset components) originating from the offset of the Y-axis gyro sensor 5, and becomes data that represents the pitch rate $\omega_y$ with high accuracy.

The inclination information generating unit 43 calculates a road inclination value RI by multiply the pitch rate data PD12, generates the inclination information AI representing the inclining state of the PND 1 based on the road inclination value RI, and supplies this to the navigation unit 26 (FIG. 7).

Specifically, the inclination information generating unit 43 compares the road inclination value RI with predetermined uphill threshold TU and downhill threshold TD. Incidentally, the uphill threshold TU and downhill threshold TD are values determined beforehand based on experiments and the like.

If the road inclination value RI is less than the downhill threshold TD, the inclination information generating unit 43 determines that the vehicle 9 is currently moving along a hill downwards, and sets the inclination information AI as "downhill". Also, if the road inclination value RI is the same or greater than the downhill threshold TD and less than the uphill threshold TU, the inclination information generating unit 43 determines that the vehicle 9 is currently moving along an approximately flat road, and sets the inclination information AI as "flat". Further, if the road inclination value RI is greater than the uphill threshold TU, the inclination information generating unit 43 determines that the vehicle 9 is currently moving along a hill upwards, and sets the inclination information AI as "uphill".

Thus the inclination calculation unit 28 corrects the error components from the angular velocity as to the pitch rate data PD and uses the offset correction value CF to correct the offset components, after which compares the road inclination value RI made up of the multiplied value thereof with the uphill threshold TU and downhill threshold TD, thereby generating the inclination information AI.

1-5-2. Computing Offset Correction Values

Next, the computing of the offset value CF by the inclination computing unit 28 will be described. The attachment angle correction unit 41 supplies the pitch rate data PD11 with the corrected error components from the attachment angle to an accumulation unit 44.

The accumulation unit 44 is made up of a ring buffer memory, for example, and accumulates the pitch rate data PD11 of a past predetermined period (e.g. one minute).

Also, the accumulation unit 44 reads out and supplies the accumulated pitch rate data PD11, according to requests from the offset correction value calculating unit 45.

Now, with an actual road, the inclination angle does not continuously increase nor does the inclination angle continuously decrease, but increases and decreases vary within relatively short segments. Therefore in the case of a vehicle 9 moving along an actual road, the pitch rate data PD generated by the Y-axis gyro sensor 5 varies between increasing and decreasing every relatively short time period.

This indicates that, if the average value of the pitch rate data PD is calculated over a time period longer than that of the pitch rate data PD increases and decreases, the average value herein will represent the offset value itself.

Using this information, the offset correction value calculation unit 45 reads out the pitch rate data PD 11 from the accumulation unit 44, calculates an average value thereof (i.e. movement average), and sets the calculated average value to the newest offset correction value CF.

Also, the offset correction value calculation unit 45 repeats the offset correction value CF every relatively short time period (e.g. one second), thereby constantly updating to the newest offset correction value CF.

Now, the temperature of the Y-axis gyro sensor 5 actually varies relatively mildly. Therefore the offset correction value calculation unit 45 uses only the most recent pitch rate data PD, thereby using the pitch gyro data PD 11 generated by the Y-axis gyro sensor 5 having approximately the same temperature as the current point-in-time to calculate the offset correction value CF appropriate to the temperature at the current point-in-time.

Thus the inclination calculation unit 28 calculates the offset correction value CF based on the most recent (i.e. in the past) pitch rate data PD, and further updates in a relatively short cycle.

1-5-3. Selection of Pitch Rate Data

Now, let us imagine a case that the vehicle 9 is moving along a hill having a relatively steep inclination, e.g. the entrance ramp on a freeway in a city. At this time the vehicle 9 is assumed to move along an approximately flat road, then move along a steep uphill, and again move along an approximately flat road.

Figure 13A:
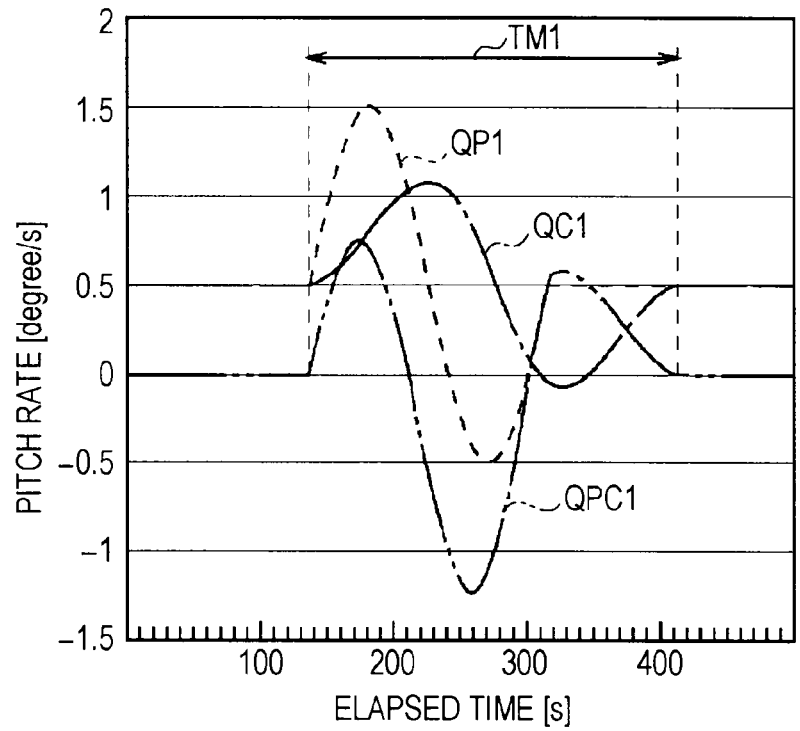
FIGS. 13A and 13B are schematic diagrams illustrating a change of pitch rate and road inclination values (part 1)

At this time the pitch rate $\omega_y$ indicated by the pitch rate data PD changes, during a relatively short time period TM1, from roughly 0 via a positive value and negative value and again to roughly 0, as shown in FIG. 13A as a property curve QP1.

Now, in the case that the pitch rate data PD is used as is to calculate the average value thereof with the offset correction value calculation unit 45 as an offset correction value CF, the offset correction value CF changes into a relatively large value and relatively small value, as shown with the property curve QC1.

However, as described above, the offset components are values highly dependent on the temperature of the Y-axis gyro sensor 5, the correct offset correction value CF does not sharply change. That is to say, an offset correction value CF such as shown by the property curve QC1 no longer is a value representing the original offset components.

In the case of correcting the pitch rate data PD using the offset correction value CF with the offset correction unit 42, the pitch rate $\omega_y$ indicated by the pitch rate data PD 12 after correction becomes a distorted wave as shown with the property curve QPC1.

Figure 13B:
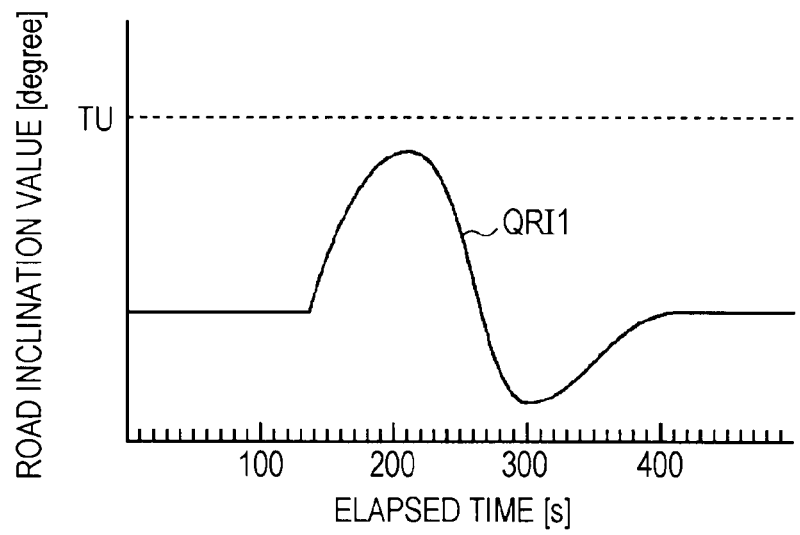

Also, the road inclination value RI derived by multiplying the pitch rate data PD after correction with the inclination information generating unit 43 may have a maximal value what is less than the uphill threshold TU, as shown with the property curve QP1 in FIG. 13B, for example.

In such as case, the inclination information generating unit 43 should determine that the vehicle is moving along an hill upwards, but determines that the vehicle is moving along a road that is approximately flat, and sets the inclination information AI as "flat". Accordingly, the navigation unit 26 using the inclination information AI selects an erroneous road as the road currently moving along, and may present an erroneous current position to the user.

In the case that the pitch rate data PD serving as the horizontal axis angular velocity exceed a predetermined range with zero as the center thereof, the inclination calculation unit 28 excludes the pitch rate data PD and calculates the offset correction value CF.

Specifically, the inclination calculation unit 28 supplies the pitch rate data PD to the attachment angle correction unit 46. The offset correction unit 46 corrects the pitch rate data PD, using the offset correction value CF immediately prior that is calculated using the pitch rate data PD immediately prior.

That is to say, the offset correction unit 46 subtracts the offset correction value CF from the pitch rate data PD, thereby generating a pitch rate data PD21 after correction, and supplies this to an accumulation control unit 47.

The accumulation control unit 47 determines whether or not the pitch rate data PD21 satisfies the pitch rate conditions serving as the horizontal determining condition, and specifically determines whether or not the pitch rate data PD21 is within a range of a pitch rate upper limit value PUL and pitch rate lower limit value PDL.

Now, in the case that the pitch rate data PD 21 satisfies the pitch rate conditions, the accumulation control unit 47 accumulates the pitch rate data PD 11 supplied to the accumulation unit 44 at this time. On the other hand, in the case that the pitch rate data PD 21 does not satisfy the pitch rate conditions, the accumulation control unit 47 deletes the pitch rate data PD 11 supplied to the accumulation unit 44 at this time without allowing accumulation.

Also, on a curved road (so-called curve), there are cases wherein the inner side of the road is made lower and the outer side is higher, i.e. a so-called bank is formed, to handle the centrifugal force acting upon the vehicle 9.

Figure 14A:
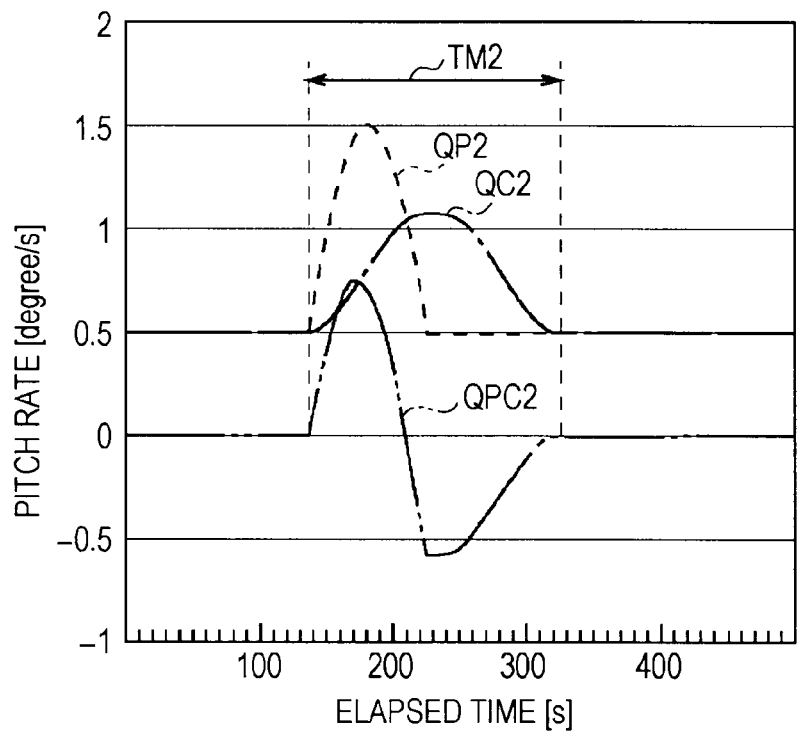
FIGS. 14A and 14B are schematic diagrams illustrating a change of pitch rate and road inclination values (part 2)

In the case that the vehicle 9 is thus moving along a road having a bank formed, the PND 1 inclinations to the left side or the right side as to the advancing direction of the vehicle 9, as to the horizontal direction. At this time there are cases wherein the pitch rate data PD generated by the Y-axis gyro sensor 5 changes relatively widely during a time period TM2, even if there is no inclination relating to the advancing direction of the road, as shown with the property curve QP2 in FIG. 14A, for example.

In the case that the pitch rate data PD is used as is, and average value thereof is calculated by the offset correction value calculation unit 45 to set the offset correction value CF, the offset correction value CF changes to a relatively large value as shown with the property curve QC2.

The offset correction value CF shown with the property curve QC2 becomes a value that no longer shows the original offset components, similar to the case with the property curve QC1 shown in FIG. 13A.

In the case that the offset correction value CF is used to correct the pitch rate data PD with the offset correction unit 42, the pitch rate $\omega_y$ shown by the pitch rate data PD 12 after correction becomes a distorted wave as shown with the property curve QPC2.

Figure 14B:
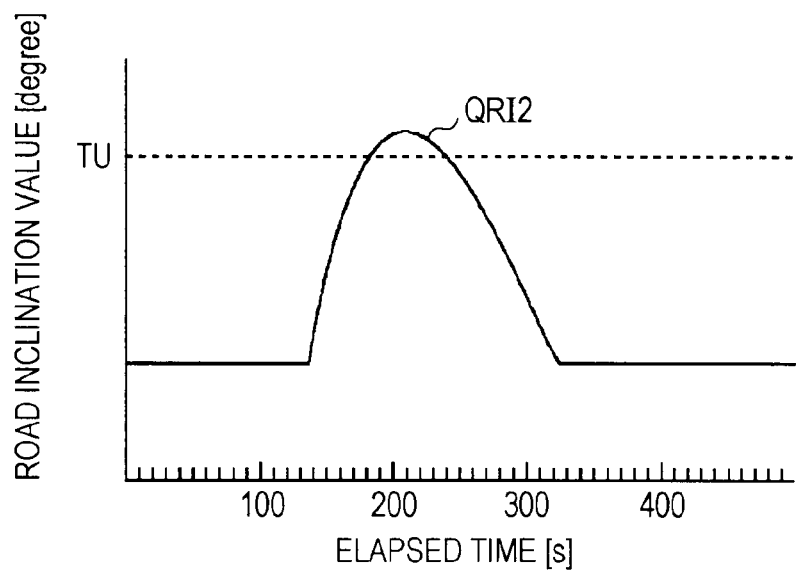

In this case, the road inclination value RI obtained with the inclination information generating unit 43 by multiplying the pitch rate data PD12 may have a maximal value thereof that is the same or greater than the uphill threshold TU, as shown in the property curve QRI2 shown in FIG. 14B, for example. In this case the inclination information generating unit 43 may erroneously set the inclination information AI that should be set as "flat" to "uphill". Therefore the navigation unit 26 may select an erroneous road as the road currently moving along, and may present an erroneous current position to the user.

Now with the inclination calculation unit 28, even when the value of the yaw rate data YD exceeds a predetermined range of which 0 is the center, the pitch rate data PD at this time is excluded to calculate the offset correction value CF.

Specifically the inclination calculation unit 28 supplies the yaw rate data YD to the yaw rate correction unit 48 along with the attachment angle correction unit 41. The yaw rate correction unit 48 uses a predetermined yaw rate correction value to correct the yaw rate data YD, thereby counterbalancing the offset components included in the yaw rate data YD and generating a yaw rate data YD21, and supplies this to the accumulation control unit 47.

The accumulation control unit 47 determines whether or not the yaw rate data YD21 satisfies the yaw rate conditions, and specifically determines whether or not the yaw rate data YD21 is within a range of a predetermined yaw rate upper limit value YUL and yaw rate lower limit value YDL.

In the case that the yaw rate data YD satisfies the yaw rate conditions, the accumulation control unit 47 allows the pitch rate data PD11 supplied to the accumulation unit 44 at this time to accumulate. On the other hand, in the case that the yaw rate data YD does not satisfy the yaw rate conditions, the accumulation control unit 47 deletes the pitch rate data PD11 supplied to the accumulation unit 44 without allowing accumulation.

That is to say, the accumulation control unit 47 allows the pitch rate data PD11 supplied to the accumulation unit 44 to accumulate only in the case that both the pitch rate conditions and yaw rate conditions are satisfied, and deletes the data in other cases. In other words, accumulation is allowed selectively.

The offset correction calculation unit 45 calculates the average value of the pitch rate data PD 11 selectively accumulated in the accumulation unit 44 by the accumulation control unit 47, thereby calculating the offset correction value CF. Hereafter, the accumulation control unit 47, accumulation unit 44, and offset correction value calculation unit 45 are also summarily called a correction value generating unit 49.

Figure 15A:
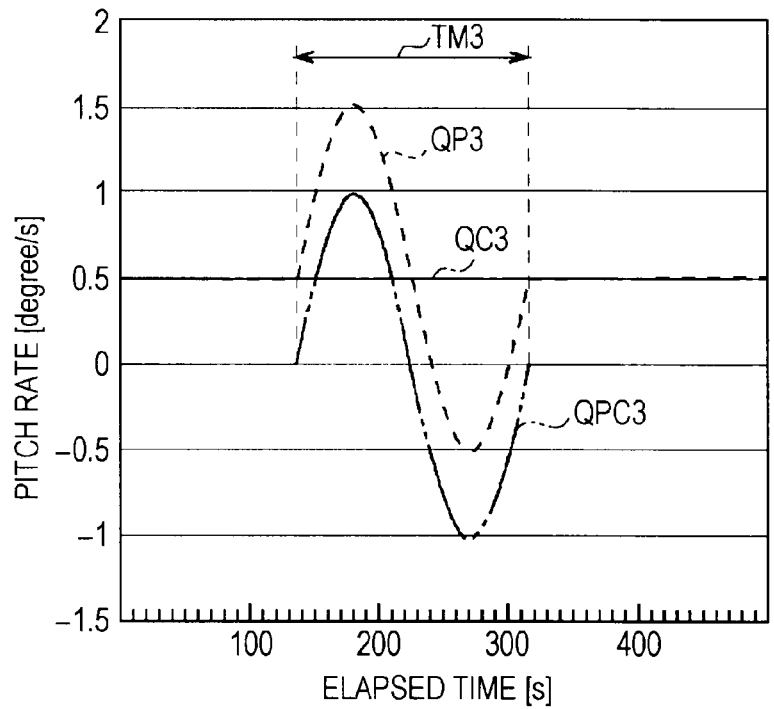
FIGS. 15A and 15B are schematic diagrams illustrating a change of pitch rate and road inclination values (part 3)

Now, a property curve QP3 that is the same as the property curve QP1 in FIG. 13A is shown in FIG. 15A. Also, the offset correction value CF computed using the pitch rate data PD that has been selectively accumulated by the accumulation control unit 47 is shown as a property curve QC3.

As we can see from the property curve QC3, by selectively accumulating the pitch rate data PD by the accumulation control unit 47, the offset correction value CF can be maintained as an approximately fixed value wherein large changes do not occur.

This is aligned with the temperature of the Y-axis gyro sensor 5 not changing sharply and the offset components not changing sharply. That is to say, the offset correction value CF that is calculated by selectively accumulating the pitch rate data PD with the accumulation control unit 47 can be considered a value that favorably reflects the true offset components.

In the case that the pitch rate data PD is corrected with the offset correction unit 42 by using the offset correction value CF thus calculated, the pitch rate $\omega_y$ indicated by the pitch rate data PD12 after correction becomes a wave that is similar to the property curve QP3 shifted in an approximately parallel manner, as shown by the property curve QPC3.

Figure 15B:
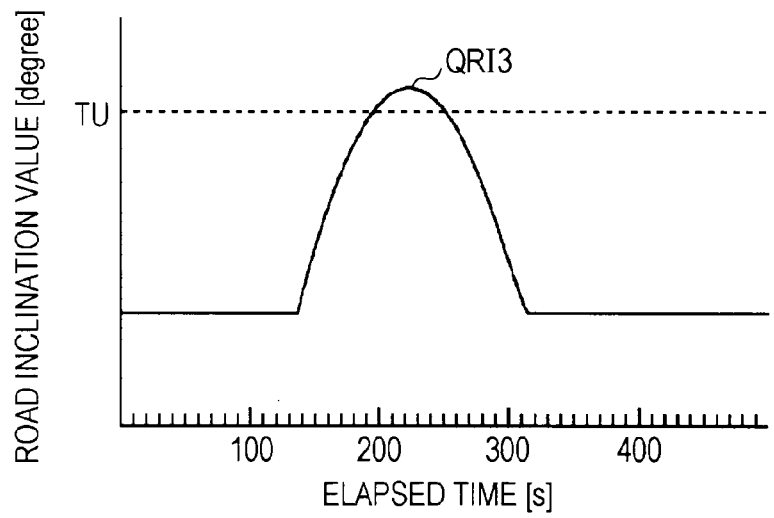

The road inclination value RI obtained by multiplying the pitch rate data PD12 after correction with the inclination information generating unit 43 differs from the case in FIG. 13B, and has a maximal value thereof that is the same or greater than the uphill threshold value TU, as shown by the property curve QRI3 in FIG. 15B, for example.

In such a case, the inclination information generating unit 43 can correctly determine movement along a hill upwards, where the determination should be made that the movement is along a hill upwards, and can set the inclination information AI as "uphill". Accordingly, the navigation unit 26 that uses the inclination information AI can select the correct road as the road being traveled currently, and can present the correct current position to the user.

Thus the inclination calculation unit 28 selectively accumulates the pitch rate data PD with the correction value generating unit 49 and sets the average value thereof as the offset correction value CF, thereby enabling the offset components of the pitch rate data PD to be appropriately corrected, whereby the correct inclination information AI can be generated.

1-5-4. Inclination Information Generating Processing Procedures

Figure 16:
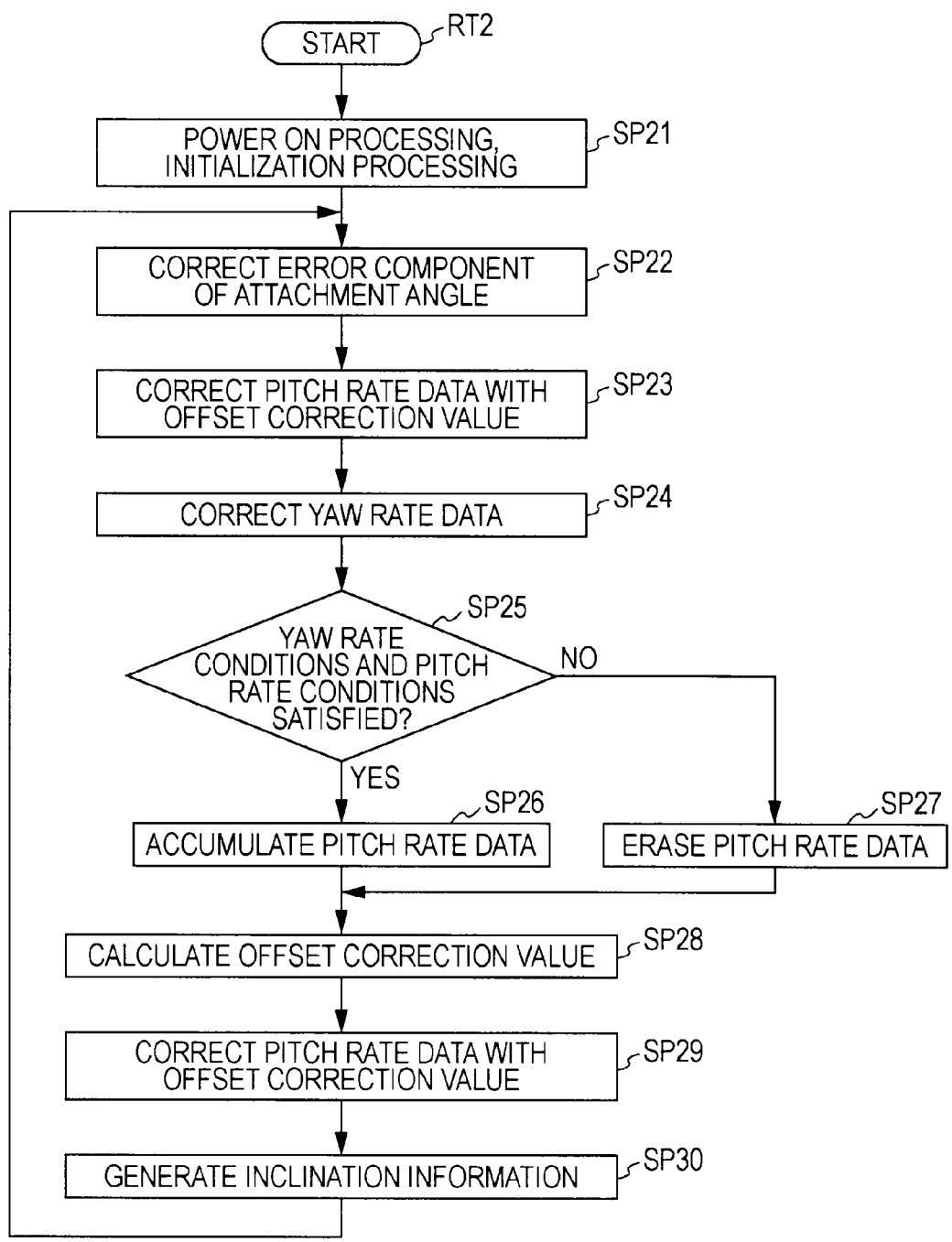
FIG. 16 is a flowchart to accompany description of inclination information generating processing procedures.

Next, inclination information generating processing procedures for the control unit 11 of the PND 1 to generate the inclination information AI, having corrected the pitch rate data PD using the offset correction value CF, will be described with reference to the flowchart in FIG. 16.

In actual practice the control unit 11 enters from the starting step of a routine RT2 and advances to step SP21. In step SP21 the control unit 11 executes predetermined power-on processing and various types of initialization processing, and subsequently advances to the following step SP22.

In step SP22 the control unit 11 uses the yaw rate data YD to correct the error components originating from the attachment angle included in the pitch rate data PD with the attachment angle correction unit 41 of the inclination calculation unit 28, and generates the pitch rate data PD11. Next the control unit 11 supplies the generated pitch rate data PD11 to the offset correction unit 42 and accumulation unit 44, and advances to the following step SP23.

In step SP23 the control unit 11 uses the offset correction value CF immediately prior to correct the pitch rate data PD with the pitch rate correction unit 46 of the inclination calculation unit 28, thereby generating the pitch rate data PD 21, and advances to the following step SP24.

In step SP24 the control unit 11 corrects the yaw rate data YD with the yaw rate correction unit 48 of the inclination calculation unit 28, thereby generating the yaw rate data YD 21, and advances to the following step SP25.

In step SP25 the control unit 11 determines whether or not the pitch rate data PD 21 satisfies the pitch rate condition with the accumulation control unit 47 of the inclination calculation unit 28, and whether the yaw rate data YD21 satisfies predetermined yaw rate conditions.

If a positive result is obtained here, this indicates that the pitch rate data PD has not changed greatly and that an appropriate offset correction value CF can be calculated by averaging. At this time the control unit 11 advances to the following step SP26.

In step SP26 the control unit 11 allows accumulation of the pitch rate data PD11 supplied to the accumulation unit 44 by the accumulation control unit 47, causing this to serve as a portion of the generating source of the offset correction value CF, and advances to the following step SP28.

On the other hand, if a negative result is obtained in step SP25, this indicates that the pitch rate data PD has changed greatly and that this is not appropriate for calculation of the offset correction value CF, and at this time the control unit 11 advances to the following step SP27.

In step SP27 the control unit 11 deletes the pitch rate data PD11 supplied to the accumulation unit 44 by the accumulation control unit 47 and does not allow accumulation, thereby excluding the data from the offset correction value CF, and advances to the following step SP28.

In step SP28 the control unit 11 calculates an average value of the pitch rate data PD11 accumulated in the accumulation unit 44 by the offset correction value calculation unit 45 and sets this as the newest offset correction value CF, and advances to the following step SP29.

In step SP29 the control unit 11 uses the newest offset correction value CF by the offset correction unit 42 to correct the pitch rate data PD11, thereby generating the pitch rate data PD12, and advances to the following step SP30.

In step SP30 the control unit 11 generates the inclination information AI based on the road inclination value RI, having calculated the road inclination value RI by multiplying the pitch rate data PD12 with the inclination information generating unit 43 of the inclination calculation unit 28, and supplies this to the navigation unit 26. Subsequently, the control unit 11 returns again to step SP22 after awaiting a predetermined period of time (e.g. one second) and repeats the series of processing.

Incidentally, in the case that shifting to a power-off or suspended state is instructed via the power switch on the operating unit 13, the control unit 11 ends the series of inclination information generating processing procedures RT2.

1-6. Operations and Advantages

With the configuration described above, the control unit 11 of the PND 1 allows the pitch rate data PD11 to accumulate in the accumulation unit 44 by the accumulation control unit 47 of the inclination calculation unit 28 in the case that the pitch rate conditions are satisfied, based on the pitch rate data PD21 wherein the offset components have been corrected.

Thus by providing pitch rate conditions, the accumulation control unit 47 can exclude the pitch rate data PD that is obtained when the road surface is a relatively steep inclination and only the offset components do not appear in all cases.

Also, the control unit 11 calculates the offset correction value CF based on the pitch rate data PD 11 that is accumulated in the accumulation unit 44 by the offset correction value calculation unit 45 of the inclination calculation unit 28.

Thus, the offset correction value calculation unit 45 can calculate the offset correction value CF based on only the pitch rate data PD11 which satisfies the pitch rate conditions, only by calculating the average value of the pitch rate data PD11 accumulated in the accumulation unit 44.

Further, the control unit 11 uses the newest offset correction value CF to correct the pitch rate data PD11 with the offset correction unit 42 of the inclination calculation unit 28, thereby generating the pitch rate data PD12, and generates the inclination information AI based on the pitch rate data PD12 and supplies this to the navigation unit 26.

If the current position of the vehicle 9 calculated based on the current position data NPD1 or NPD2 is an inclination branching location, the navigation unit 26 determines which of the roads is the current position based on the inclination information AI, and after generating a map image including the current position thereof, displays the map image on the display unit 2.

Accordingly, the control unit 11 can generate the offset correction value CF, appropriately excluding the pitch rate data PD11 that is obtained with a steep hill or the like, is made of a relatively large value, and does not represent only the offset components in all cases, with the correction value generating unit 49 of the inclination calculation unit 28.

As a result, the control unit 11 can generate inclination information AI with the inclination information generating unit 43 of the slop calculation unit 28 that appropriately reflects the actual road surface inclining, and can select the correct road from multiple roads at an inclination branching location with the navigation unit 26.

Also, the control unit 11 allows the pitch rate data PD11 to accumulate in the accumulation unit 44 with the accumulation control unit 37, only in the case that the pitch rate conditions and yaw rate conditions are satisfied. Thus the accumulation control unit 47 can exclude the pitch rate data PD that varies unrelated to the inclination relating to the advancing direction of a road have a bank formed, from the generating source of the offset correction value CF.

Further, the control unit 11 can exclude the error components that originate from the attachment angle of the PND 1 as to the vehicle 9 and that are included in the pitch rate data PD, with the attachment angle correction unit 41. Thus, the control unit 11 can further improve accuracy of the road slop value RI and inclination information AI computed by the inclination information generating unit 43.

According to the above-described configuration, the control unit 11 of the PND 1 calculates an offset correction value CF with the correction value generating unit 49, based on the pitch rate data PD11 when the pitch rate data PD21 satisfies the pitch rate conditions. Also, the control unit 11 uses the calculated offset correction value CF to correct the pitch rate data PD11 with the offset correction unit 42, and based on this, generates the inclination information AI with the inclination information generating unit 43. Accordingly, the control unit 11 can exclude the pitch rate data PD that is obtained with a steep hill or the like and does not represent the offset components to generate the offset correction value CF, and can appropriately exclude the offset components from the pitch rate data PD with the offset correction value CF.

2. Second Embodiment

Figure 17:
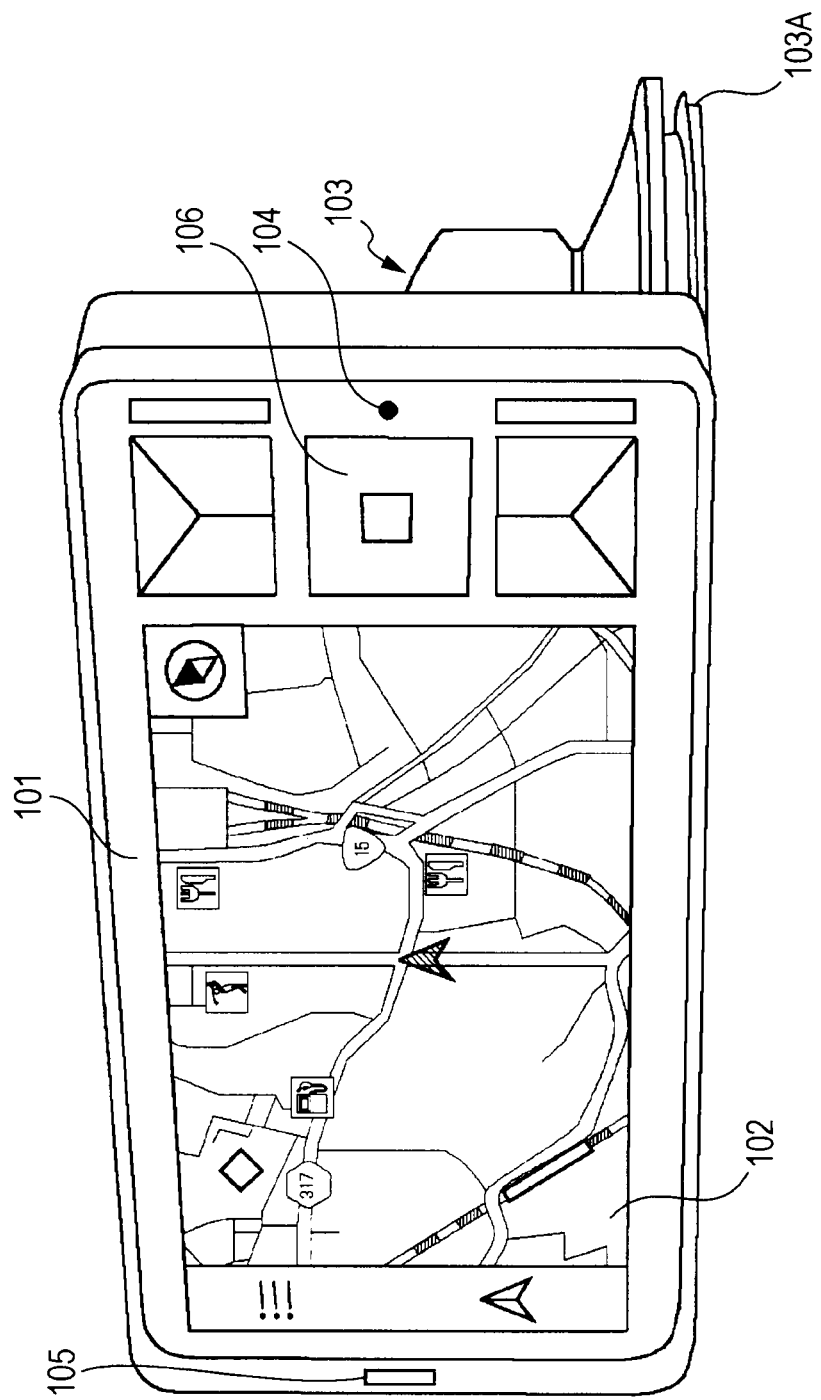
FIG. 17 is a schematic diagram illustrating an overall configuration of a cellular phone.

A cellular phone 101 according to a second embodiment has a display unit 102 that is made up of an LCD (Liquid Crystal Device) to perform various types of displays, a microphone 104, speaker 105, and an operating unit 106 made up of an input button or the like, as shown in FIG. 17.

Also, similar to the PND 1 of the first embodiment, the cellular phone 101 is made to be attachable to the vehicle 9 (FIG. 4) via a cradle 103.

Figure 18:
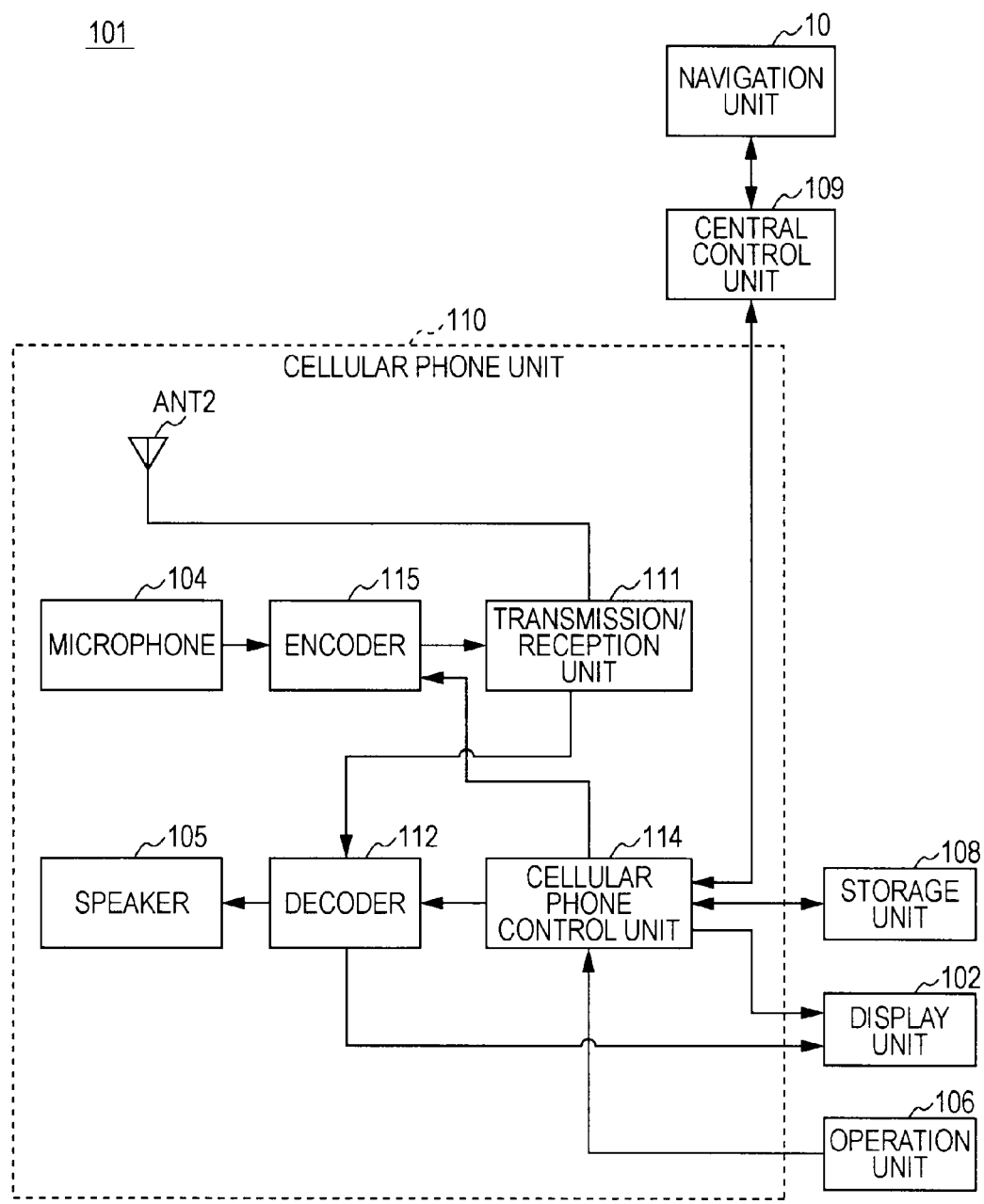
FIG. 18 is a schematic diagram illustrating a circuit configuration of a cellular phone.

As shown in FIG. 18, with the cellular phone 101, a central control unit 109 controls a cellular phone unit 110 serving the function as a cellular phone, and a navigation unit 10 which performs navigation processing similar to that in the above-described first embodiment.

The cellular phone unit 110 is connected to the display unit 102 and the operating unit 106, and also to a storage unit 108 which is made up of a semiconductor memory or the like and is used for saving various types of data. Incidentally, although omitted from FIG. 18, the display unit 102, operating unit 106, and storage unit 108 are also each connected to the navigation unit 10.

In the case of executing a telephone call communication function, the cellular phone 101 uses the cellular phone unit 110 to realize communication functions and email functions. In actual practice, the cellular phone unit 110 of the cellular phone 101 transmits the reception signals received from an unshown base station via an antenna ANT2 to a transmission/reception unit 111.

The transmission/reception unit 111 is made up of a transmission unit and a reception unit, and exchanges reception data by demodulating or the like of the reception signals according to a predetermined method, and transmits this to a decoder 112. The decoder 112 decodes the reception data according to control by the cellular phone control unit 114 made in a microcomputer configuration, thereby restoring the telephone call audio data of the telephone call partner, and outputs this to the speaker 105. The speaker 105 outputs the telephone call audio of the partners, based on the telephone call audio data.

On the other hand, the cellular phone unit 110 transmits the audio signals collected from the microphone 104 to an encoder 115. The encoder 15 digitally converts the audio signal according to control by the cellular phone control unit 114, and subsequently transmits the audio data obtained by encoding this with a predetermined method to the transmission/reception unit 111.

Upon demodulating the audio data according to a predetermined method, the transmission/reception unit 111 is wirelessly transmitted to a base station (unshown) via the antenna ANT2.

At this time the cellular phone control unit 114 of the cellular phone unit 110 displays the telephone number and wave reception state and so forth of the partner on the display unit 102, according to operating commands from the operating unit 106.

Also, in the case of receiving email with the communication function, the cellular phone control unit 114 of the cellular phone unit 110 supplies the reception data from the transmission/reception unit 111 to the decoder 112, transmits the email data restored by decoding the reception data on the display unit 102, and displays the email content on the display unit 102, and stores this on the storage unit 108.

Further, in the case of transmitting email with the communication function, upon encoding the email data input via the operating unit 106 by the encoder 115, the cellular phone control unit 114 of the cellular phone unit 110 wireless transmits this via the transmission/reception unit 111 and antenna ANT2.

On the other hand, in the case of executing the navigation function, the overall control unit 109 controls the navigation unit 10, and executes navigation processing.

Similar to the first embodiment, the navigation unit 10 generates inclination information AI with the inclination calculating unit 28 (FIG. 12) of the control unit 11, and supplies this to the navigation unit 26.

Similar to the first embodiment, the inclination calculation unit 28 allows the pitch rate data PD11 to be accumulated in the accumulation unit 44 by the accumulation control unit 47 in the case that the pitch rate conditions are satisfied, based on the pitch rate data PD21 wherein the offset components have been corrected.

Also, the inclination calculation unit 28 calculates the offset correction value CF based on the pitch rate data PD11 accumulated in the accumulation unit 44 with the offset correction value calculation unit 45.

Further, the inclination calculation unit 28 generates the pitch rate data PD12 by using the newest offset correction value CF to correct the pitch rate data PD11 with the offset correction unit 42, generates the inclination information AI based on the pitch rate data PD12 with the inclination information generating unit 43, and supplies this to the navigation unit 26.

If the current position of the vehicle 9 calculated based on the current position data NPD1 or NPD2 is an inclination branching location, the navigation unit 26 determines one of the roads to be the current position based on the inclination information AI, and after generating a map image which includes the current position thereof, displays the map image on the display unit 102.

Accordingly, the cellular phone 101 according to the second embodiment can appropriately exclude the pitch rate data PD11 which is a relatively large value and which does not show only the offset component in all cases, with the correction value generating unit 49 of the inclination calculation unit 28 of the control unit 11 of the navigation unit 10, and can generate an offset correction value CF. Thus the control unit 11 can use the offset correction value CF to appropriately exclude the offset components from the pitch rate data PD11 with the offset correction unit 42 of the inclination calculation unit 28.

As a result, the cellular phone 101 can generate inclination information AI that appropriately reflects the actual inclination of the road surface, with the inclination information generating unit 43 of the inclination calculation unit 28 of the control unit 11, and the correct road can be selected by the navigation unit 26 from multiple roads at an inclination branching location.

According to the above-described configuration, the cellular phone 101 according to the second embodiment computes an offset correction value CF, based on the pitch rate data PD11 when the pitch rate data PD21 satisfies the pitch rate conditions, with the correction value generating unit 49 of the control unit 11 of the navigation unit 10. Also, the control unit 11 uses the calculated offset correction value CF to correct the pitch rate data PD11 with the offset correction unit 42, and generates the inclination information AI, based thereupon, with the inclination information generating unit 43. Accordingly, similar to the first embodiment, the cellular phone 101 can exclude the pitch rate data PD which is obtained with a steep hill or the like and which does not represent the offset components, and generate the offset correction value CF, and the offset components can be appropriately excluded from the pitch rate data PD with the offset correction value CF herein.

3. Other Embodiments

Note that according to the above-described embodiments, description has been given wherein determination is made as to whether or not the pitch rate data PD11 is accumulated in the accumulation unit 44 by the accumulation control unit 47 of the correction value generating unit 49, and an offset correction value CF is generated by calculated the average value of the pitch rate data PD11 of the accumulation unit 44 with the offset correction value calculation unit 45.

However, the present invention is not restricted limited to this, and determination may be made as to whether or not to add the pitch rate data PD11 with the accumulation control unit 47, for example, and calculate a new offset correction value CF by weighted adding of the offset correction value CF immediately prior with the pitch rate data PD1 that has been determined to be added. Also for example, the multiplied value of the pitch rate data PD11 within a predetermined time period (e.g. the past one minute) can be stored in the accumulation unit 44, and the offset correction value CF calculated by the offset correction value calculation unit 45 performing division.

That is to say, with the correction value generating unit 49, generating the offset correction value CF by calculating the average value for only the pitch rate data PD11 when the pitch rate data PD21 satisfies the pitch rate condition is sufficient.

Also, with the above-described embodiments, description has been given for a case where the average value of the pitch rate data PD11 accumulated in the accumulation unit 44 is set as the offset correction value CF.

However, the present invention is not restricted to this, a so-called weighted adding average value wherein different coefficients based on the newness of the pitch rate data PD11 are added and the average value thereof calculated may be used as the offset correction value CF. Also, besides the average value, values obtained by various statistical computing methods such as the square root of the sum of squares or the like, for example, can be used as the offset correction value CF.

Further, with the above-described embodiments, description has been given for a case wherein the pitch rate data PD11 is accumulated in the accumulation unit 44 only in the case that both the pitch rate conditions and the yaw rate conditions are satisfied.

However, the present invention is not restricted to this, and the pitch rate data PD11 may be accumulated in the accumulation unit 44 in the case of only the pitch rate condition being satisfied, regardless of the yaw rate conditions, for example.

However, in this case, the potential increases for erroneous inclination information AI to be generated by erroneous components originating from the banked road.

Further, with the above-described embodiments, description has been given for a case wherein the yaw rate data YD is used by the attachment angle correction unit 41 to correct the error components that originate from the attachment angle of the PND1 and that are included in the pitch rate data PD.

However, the present invention is not restricted to this, and in the case determination is made that the error by the attachment angle is extremely small, the attachment angle correction unit 41 may be omitted, and only the offset components may be corrected with the offset correction unit 42.

Further, with the above-described embodiments, description has been given for a case wherein determination is made as to whether or not the pitch rate conditions are satisfied by the accumulation control unit 47, based on the pitch rate data PD21 wherein the offset components are corrected by the offset correction unit 46.

However, the present invention is not restricted to this, and determination may be made as to whether or not the pitch rate conditions are satisfied with the accumulation control unit 47, based on the pitch rate data PD before correction, for example. In this case, setting the pitch rate upper limit value PUL and pitch rate lower limit value PDL respectively with consideration for the offset components is sufficient.

Further, with the above-described embodiments, description has been given for a case wherein determination is made as to whether or not the yaw rate conditions are satisfied by the accumulation control unit 47, based on the yaw rate data YD21 wherein the offset components are corrected by the yaw rate correction unit 48.

However, the present invention is not restricted to this, and determination may be made as to whether or not the yaw rate conditions are satisfied with the accumulation control unit 47, based on the yaw rate data YD before correction, for example. In this case, setting the yaw rate upper limit value YUL and yaw rate lower limit value YDL respectively with consideration for the offset components is sufficient.

Figure 19:
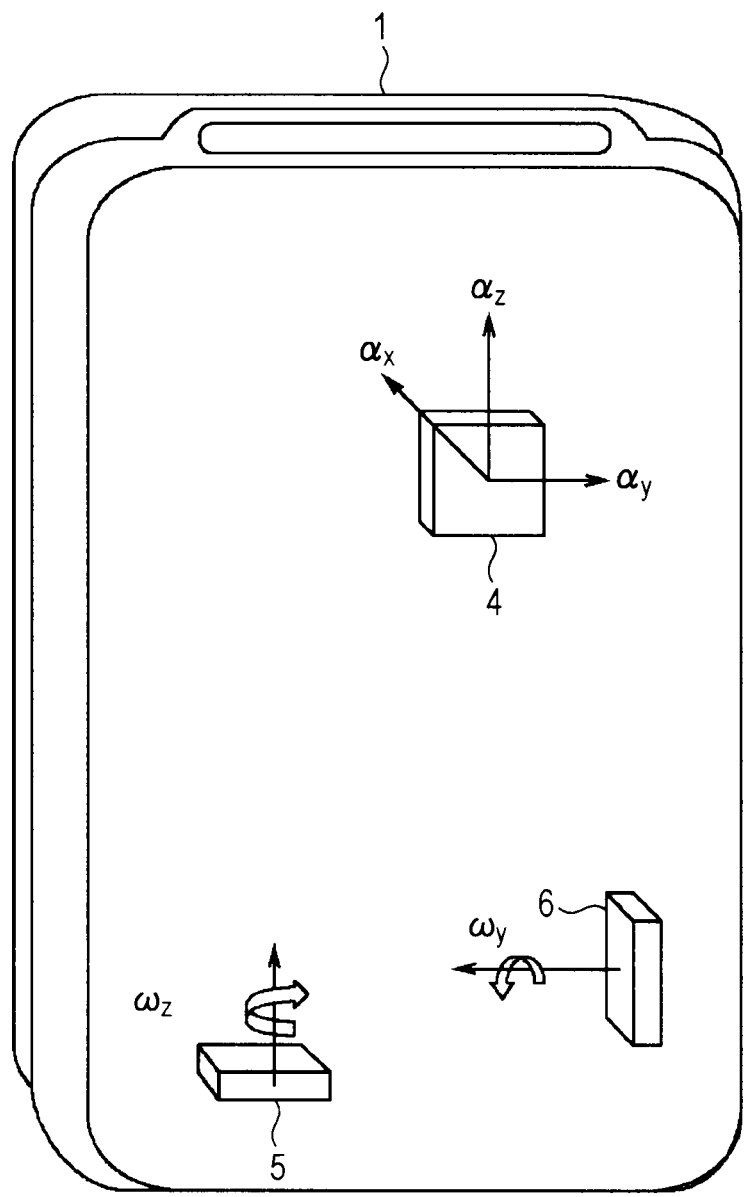
FIG. 19 is a schematic diagram illustrating a usage example according to another embodiment.

Further, according to the above-described first embodiment, description has been given for a case wherein the PND 1 is used in a state of being placed sideways to be long in the left/right direction. However, the present invention is not restricted to this, and may be arranged such that the PND 1 is used in the state that of being placed vertically to be long in the vertical direction, as shown in FIG. 19. In this case the PND 1 detects the yaw rate u around the Z-axis with the Y-axis gyro sensor 5, and detects the pitch rate $\omega_y$ around the Y-axis with the Z-axis gyro sensor 6. This is the same with the second embodiment.

Further, according to the above-described first embodiment, description has been given for a case wherein a triaxial acceleration sensor 4, Y-axis gyro sensor 5, and Z-axis gyro sensor 6 are provided within the PND 1. However, the present invention is not restricted to this, and may be arranged such that the triaxial acceleration sensor 4, Y-axis gyro sensor 5, and Z-axis gyro sensor 6 are provided external to the PND 1. This is the same with the second embodiment.

Also, the PND1 can provide an adjusting mechanism on the side face of the PND 1, for example, so as to enable adjustments to the attaching angle of the triaxial acceleration sensor 4, Y-axis gyro sensor 5, and Z-axis gyro sensor 6.

Thus, even in a case wherein the PND 1 is not installed so that the display unit 2 thereof is approximately vertically as to the advancing direction of the vehicle 9, by the user adjusting the adjustment mechanism, for example the rotation axis of the Y-axis gyro sensor 5 can be matched to the vertical direction of the vehicle 9. As described above, the attachment angle correction unit 41 of the inclination calculation unit 28 may be omitted. This is the same with the second embodiment.

Further, according to the above-described first embodiment, description has been given for a case wherein the present invention is applied to the PND 1 that operates by an internal battery in the event of being attached to the vehicle 9 via the cradle 3, and removed from this cradle 3. However, the present invention is not restricted to this, and for example the present invention may be applied to a navigation device that is built in to the vehicle 9 and is a stationary type, for example.

Further, according to the above-described first embodiment, description has been given for a case wherein the PND 1 is attached to a vehicle 9 which is an automobile, but the present invention is not restricted to this, and the PND 1 can be attached to moving objects that move along various movement surfaces, such as a motorcycle, bicycle, or train. In this case, fixing the cradle 3 to the moving object via a predetermined attachment or the like is sufficient.

Further, according to the above-described second embodiment, description has been given for a case wherein the present invention is applied to a navigation unit 10 of a cellular phone 101. However, the present invention is not restricted to this application, and for example, the present invention may be applied to various types of electronic devices having a navigation function and Y-axis gyro sensor 5, such as a computer device or digital camera or the like, for example.

Further, according to the above-described first embodiment, description has been given for a case wherein the control unit 11 of the PND 1 performs inclination information generating processing for the above-described routine RT2, according to an application program stored beforehand in the storage unit 12.

However, the present invention is not restricted to this, and the control unit 11 of the PND 1 can perform the above-described inclination information generating processing according to application programs installed from a storage medium, application programs downloaded from the Internet, and application programs installed by other various routes. This is the same with the second embodiment.

Further, according to the above-described first embodiment, description has been given for a case wherein the PND 1 is configured as an angular velocity correction device with a Y-axis gyro sensor 5 serving as a horizontal angular velocity detection unit, a correction value generating unit 49 serving as a correction value generating unit, and an offset correction unit 42 serving as a correction unit.

However, the present invention is not restricted to this, and the navigation device may be made up of a horizontal angular velocity detection unit, correction value generating unit, and correction unit made with various other configurations.

Further, according to the above-described first embodiment, description has been given for a case where the PND 1 serving as a navigation device is made up with the GPS processing unit 21 or position calculation unit 25 serving as a measuring unit, the Y-axis gyro sensor 5 serving as a horizontal angular velocity detection unit, the correction value generating unit 49 serving as a correction value generating unit, the offset correction unit 42 serving as a correction unit, the inclination information generating unit 43 serving as the inclination information generating unit, and the navigation unit 26 serving as a map position calculation unit.

However, the present invention is not restricted to this, and the navigation device may be made up of a measuring unit, horizontal angular velocity detection unit, correction value generating unit, correction unit, inclination information generating unit, and map position calculation unit made with various other configurations.

Further, according to the above-described second embodiment, description has been given for a case where the cellular phone 101 serving as a cellular phone having a navigation function is made up with the GPS processing unit 21 or position calculation unit 25 serving as a measuring unit, the Y-axis gyro sensor 5 serving as a horizontal angular velocity detection unit, the correction value generating unit 40 serving as a correction value generating unit, the offset correction unit 42 serving as a correction unit, the inclination information generating unit 43 serving as the inclination information generating unit, the navigation unit 26 serving as a map position calculation unit, and a cellular phone unit 110 serving as a cellular phone.

However, the present invention is not restricted to this, and the cellular phone having a navigation function may be made up of a measuring unit, horizontal angular velocity detection unit, correction value generating unit, correction unit, inclination information generating unit, map position calculation unit, and cellular phone unit made with various other configurations.

The present application contains subject matter related to that disclosed in Japanese Priority Patent Application JP 2009-216083 filed in the Japan Patent Office on Sep. 17, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An angular velocity correction device comprising:
a horizontal angular velocity detection unit to detect horizontal axis angular velocity, that is mounted on a main unit attached to a moving object that moves along a predetermined movement surface, and that is made up of angular velocity around the horizontal axis which is orthogonal to the advancing direction of said moving object, occurring according to the inclination angle of said movement surface, the horizontal axis angular velocity being subjected to a high-pass filter processing, the horizontal axis angular velocity subjected to the high-pass filter processing being subjected to a low-pass filter processing;
a correction value generating unit to generate a correction value for correcting said horizontal axis angular velocity, based on said horizontal axis angular velocity that satisfies predetermined horizontal determining conditions of said horizontal axis angular velocity in the past; and
a correction unit to correct said horizontal axis angular velocity using said correction value,
wherein a velocity of the moving object is calculated by dividing an acceleration of the moving object by the horizontal axis angular velocity that is subjected to the high-pass filter processing and the low-pass filter processing.

2. The angular velocity correction device according to claim 1, said correction value generating unit further comprising:
an accumulation unit to accumulate said horizontal axis angular velocity in the past;
an accumulation control unit to accumulate said horizontal axis angular velocity satisfying said horizontal determining conditions of said horizontal axis angular velocity in the past, in said accumulation unit; and a correction value calculation unit to calculate said correction value based on said horizontal axis angular velocity in the past that is accumulated in said accumulation unit.

3. The angular velocity correction device according to claim 1, further comprising:

a vertical axis angular velocity detection unit to detect vertical axis angular velocity made up of angular velocity around the vertical axis of said main unit, wherein said accumulation control unit accumulation the horizontal axis angular velocity in said accumulation unit, in the case that said horizontal axis angular velocity satisfies said horizontal determining conditions, and said vertical axis angular velocity satisfies predetermined vertical determining conditions.

4. The angular velocity correction device according to claim 1, further comprising:

an attachment angle correction unit to correct said horizontal axis angular velocity, based on said vertical axis angular velocity wherein attachment angle errors are included according to the attachment angle of said main unit as to said moving object, wherein said accumulation control unit accumulates said horizontal axis angular velocity corrected by said attachment angle correction unit in said accumulation unit;

and wherein said correction unit uses said correction values to further correct said horizontal axis angular velocity corrected by said attachment angle correction unit.

5. The angular velocity correction device according to claim 1, further comprising:

a second correction unit to correct said horizontal axis angular velocity by using said correction value calculated in the past with said correction value generating unit;

wherein said correction value generating unit generates said correction values based on said horizontal axis angular velocity that satisfies said horizontal determining conditions of said horizontal axis angular velocity in the past corrected by said second correction unit.

6. The angular velocity correction device according to claim 1, wherein the velocity of the moving object is subjected to a speed and noise removal processing.

7. The angular velocity correction device according to claim 2, wherein said correction value generating unit calculates an average value of said horizontal axis angular velocity accumulated on said accumulation unit within a predetermined time period in the past as said correction value.

8. An angular velocity correction method comprising the steps of:

detecting, with a horizontal angular velocity detection unit mounted on a main unit attached to a moving object that moves along a predetermined movement surface, a horizontal axis angular velocity that is made up of angular velocity around the horizontal axis which is orthogonal to the advancing direction of said moving object, occurring according to the inclination angle of said movement surface, the horizontal axis angular velocity being subjected to a high-pass filter processing, the horizontal axis angular velocity subjected to the high-pass filter processing being subjected to a low-pass filter processing;

generating, with a predetermined correction value generating unit, a correction value for correcting said horizontal axis angular velocity, based on said horizontal axis angular velocity that satisfies predetermined horizontal determining conditions of said horizontal axis angular velocity in the past;

correcting, with a predetermined correction unit, said horizontal axis angular velocity using said correction value; and calculating a velocity of the moving object by dividing an acceleration of the moving object by the horizontal axis angular velocity that is subjected to the high-pass filter processing and the low-pass filter processing.

9. The angular velocity correction method according to claim 8, further comprising: performing a speed and noise removal processing on the velocity of the moving object.

* * * * *